US010977717B2

(12) United States Patent
Shmueli

(10) Patent No.: US 10,977,717 B2
(45) Date of Patent: Apr. 13, 2021

(54) HAND ACTIONS MONITORING DEVICE

(71) Applicant: PICKEY SOLUTIONS LTD., Tel Aviv (IL)

(72) Inventor: Omer Shmueli, Kadima-Tzoran (IL)

(73) Assignee: PICKEY SOLUTIONS LTD., Tel Aviv (IL)

( * ) Notice: Subject to any disclaimer, the term of this patent is extended or adjusted under 35 U.S.C. 154(b) by 0 days.

(21) Appl. No.: 16/881,105

(22) Filed: May 22, 2020

(65) Prior Publication Data

US 2021/0027360 A1 Jan. 28, 2021

Related U.S. Application Data

(60) Provisional application No. 62/876,995, filed on Jul. 22, 2019.

(51) Int. Cl.
| | |
|---|---|
| *G06Q 30/00* | (2012.01) |
| *G06Q 30/06* | (2012.01) |
| *G06F 1/16* | (2006.01) |
| *G06Q 20/18* | (2012.01) |
| *G06K 9/00* | (2006.01) |

(52) U.S. Cl.
CPC ......... *G06Q 30/0635* (2013.01); *G06F 1/163* (2013.01); *G06K 9/00355* (2013.01); *G06K 9/00375* (2013.01); *G06Q 20/18* (2013.01); *G06Q 30/0603* (2013.01); *G06Q 30/0639* (2013.01); *G06Q 30/0641* (2013.01)

(58) Field of Classification Search
CPC ......... G06Q 20/00; G06Q 30/00; G06Q 10/00
See application file for complete search history.

(56) References Cited

U.S. PATENT DOCUMENTS

| | | | |
|---|---|---|---|
| 8,674,810 B2 | 3/2014 | Uysal et al. | |
| 9,230,176 B2 * | 1/2016 | Choi | H04N 7/181 |
| 9,818,031 B2 * | 11/2017 | Wexler | G06F 16/583 |
| 10,772,559 B2 * | 9/2020 | Connor | A61B 5/1114 |

(Continued)

OTHER PUBLICATIONS

Radhakrishnan, Meera, et al. "Iris: Tapping wearable sensing to capture in-store retail insights on shoppers." 2016 IEEE International Conference on Pervasive Computing and Communications (PerCom). IEEE, 2016. (Year: 2016).*

(Continued)

*Primary Examiner* — Abby J Flynn
(74) *Attorney, Agent, or Firm* — Tutunjian & Bitetto, P.C.

(57) ABSTRACT

A system, a wearable device and method for monitoring hand actions. The method comprises: obtaining a visual input from a sensor located on the wearable device worn by a subject. The sensor is configured to capture at least an interior portion of a hand of the subject. The method further comprises identifying, based on the visual input, an object and an action performed by the hand of the subject with respect to an object. The method further comprises performing a responsive action based on at least one of the action and the object. The wearable device is configured to be utilized for self-service shopping, manual fulfillment of a shopping order of a customer, mapping locations of items, detecting violation of safety rules, monitoring health-care systems, managing labs or manufacturing plant, or for other applications related to hand actions monitoring.

21 Claims, 10 Drawing Sheets

(56) References Cited

U.S. PATENT DOCUMENTS

| | | | | |
|---|---|---|---|---|
| 2004/0225613 | A1* | 11/2004 | Narayanaswami | G06Q 20/40 705/64 |
| 2005/0184870 | A1* | 8/2005 | Galperin | G08B 21/22 340/568.2 |
| 2006/0136303 | A1* | 6/2006 | Bell | G06Q 30/0641 705/26.8 |
| 2007/0247526 | A1* | 10/2007 | Flook | H04N 7/18 348/161 |
| 2011/0286628 | A1* | 11/2011 | Goncalves | G06F 16/5838 382/103 |
| 2014/0249944 | A1 | 9/2014 | Hicks et al. | |
| 2015/0019391 | A1* | 1/2015 | Kumar | G06Q 10/087 705/28 |
| 2015/0029028 | A1* | 1/2015 | Sayegh | G08B 13/242 340/572.3 |
| 2015/0063661 | A1* | 3/2015 | Lee | G06F 3/0304 382/124 |
| 2015/0089455 | A1* | 3/2015 | Yamada | G06F 3/011 715/863 |
| 2015/0100445 | A1 | 4/2015 | Johnson et al. | |
| 2015/0258431 | A1* | 9/2015 | Stafford | A63F 13/211 463/31 |
| 2015/0262214 | A1* | 9/2015 | Geer | G06Q 30/0212 705/14.14 |
| 2015/0379238 | A1* | 12/2015 | Connor | G06F 19/3475 702/19 |
| 2016/0027091 | A1* | 1/2016 | McGrath | G06Q 30/0633 705/26.8 |
| 2016/0034764 | A1 | 2/2016 | Connor | |
| 2016/0125235 | A1* | 5/2016 | Gu | G06T 7/215 382/103 |
| 2016/0132110 | A1 | 5/2016 | Mutz et al. | |
| 2016/0171907 | A1* | 6/2016 | Moore | G06F 3/014 434/116 |
| 2016/0189277 | A1* | 6/2016 | Davis | B62B 5/0096 705/26.8 |
| 2016/0371633 | A1* | 12/2016 | Stout | G06K 17/0022 |
| 2017/0124552 | A1* | 5/2017 | Lee | G06Q 20/208 |
| 2017/0220831 | A1 | 8/2017 | Dasarathan et al. | |
| 2017/0323376 | A1 | 11/2017 | Glaser et al. | |
| 2018/0232796 | A1* | 8/2018 | Glaser | G06Q 90/20 |
| 2018/0235538 | A1* | 8/2018 | Connor | G16H 20/60 |
| 2018/0286185 | A1 | 10/2018 | Humphrys | |
| 2019/0057435 | A1* | 2/2019 | Chomley | G06Q 30/04 |
| 2019/0130429 | A1* | 5/2019 | Roy | G06Q 30/0235 |
| 2020/0005385 | A1* | 1/2020 | Stout | G06Q 30/0633 |
| 2020/0221754 | A1* | 7/2020 | Santana | A23P 20/20 |

OTHER PUBLICATIONS

Stinson, Liz. "This Camera Band for Apple Watch Is Legit. But Who Needs It?" Nov. 2, 2016 <https://www.wired.com/2016/11/cmra-apple-watch-camera/> (Year: 2016).*

International Search Report from PCT/IL2020/050806 dated Oct. 25, 2020, 13 pgs.

* cited by examiner

HAND ACTIONS MONITORING DEVICE

CROSS-REFERENCE TO RELATED APPLICATIONS

This application claims the benefit of U.S. provisional Application No. 62/876,995, entitled "Smart Retail Device", filed Jul. 22, 2019, which is hereby incorporated by reference in its entirety, without giving rise to disavowment.

TECHNICAL FIELD

The present disclosure relates to wearable devices in general, and to wearable device for monitoring hand actions, in particular.

BACKGROUND

AMAZON GO™ is a chain or partially automated stored, where customers are able to purchase products without being check out by a cashier or using a self-checkout station. Wikipedia details that according to a promotional video published by Amazon, the store concept uses several technologies, including computer vision, deep learning algorithms, and sensor fusion to automate much of the purchase, checkout, and payment steps associated with a retail transaction. The store concept is seen as a revolutionary model that relies on the prevalence of smartphones and geofencing technology to streamline the customer experience, as well as supply chain and inventory management. However, public rollout of the Seattle Amazon Go prototype location was delayed due to issues with the sensors' ability to track multiple users or objects within the store, such as when children move items to other shelves or when more than one customer has a similar body habitus."

The AMAZON GO™ store relies on an array of in-store sensors. The ceiling of the store has multiple cameras and store shelves have weight sensors, to detect which item a customer took. If a customer takes an item off the shelf, it will be added to the customer's virtual cart. Similarly, if a customer places an item back on the shelf, it is removed from the customer's virtual cart.

BRIEF SUMMARY

One exemplary embodiment of the disclosed subject matter is a method comprising: obtaining a visual input from a sensor located on a wearable device. The wearable device is worn by a subject. The sensor is configured to capture at least an interior portion of a hand of the subject. The method further comprises: identifying, based on the visual input, an action performed by the subject using the hand of the subject, wherein the action is performed with respect to an object, wherein said identifying comprises identifying the object. The method further comprises: performing a responsive action based on at least one of the action and the object.

Optionally, the method further comprises: in response to detecting a check-in activity being performed, continuously monitoring the subject. Said continuously monitoring the subject comprises said obtaining the visual input. Said continuously monitoring is terminated upon detecting a check-out activity being performed.

Optionally, the interior portion of the hand comprises a distal portion of a palm, whereby the visual input captures at least a portion of the object when the object is being held by the hand.

Optionally, the sensor is configured to capture an item grasped by fingers of the subject during grasping thereof.

Optionally, the wearable device is configured to be worn on a wrist of the subject, whereby positioning the sensor to face a palm of the hand.

Optionally, a view of the sensor is blocked, at least in part, by the hand.

Optionally, at least 5% of the visual input comprises a view of the interior portion of the hand.

Optionally, the action performed by the subject comprises at least one of: touching the object using the hand; picking up the object using the hand; releasing the object after being held by the hand; pressing on the object using the hand; moving, using the hand, the object from a first location to a second location; covering the object using the hand; and unwrapping the object using the hand.

Optionally, the wearable device is utilized for a self-service shopping of the subject in a store, whereby enabling the subject to shop in the store without manually scanning purchased items before leaving the store; wherein the object is an item for sale in the store; wherein said identifying comprises identifying that the subject picks up the item for sale; wherein the responsive action comprises: updating a virtual cart of the subject to include the item for sale; wherein the method further comprises: identifying a check-in activity of the subject, whereby the subject commencing a self-service shopping session at a store, wherein said identifying is performed during the self-service shopping session; and in response to identifying a check-out activity of the subject, performing a transaction based on content of the virtual cart of the subject.

Optionally, the method further comprises: obtaining a second visual input from the sensor; determining, based on the second visual input, that the subject has decided not to purchase the item for sale; and in response to said determining, updating the virtual cart of the subject to exclude the item for sale.

Optionally, the responsive action further comprises emitting an auditory cue indicating the addition of the item for sale to the virtual cart.

Optionally, the method further comprises: displaying to the subject a content of the virtual cart.

Optionally, the method further comprises: during the self-service shopping session, detecting a tampering event aimed at interfering with monitoring of the hand of the subject using the wearable device; and in response to said detecting the tampering event, performing an anti-tampering action.

Optionally, said wearable device is configured to perform said detecting only during the self-service shopping session, wherein the tampering event comprises at least one of: removal of the wearable device and blocking view of the sensor; whereby the subject is able to perform the tampering event after the self-service shopping session ends without resulting in the anti-tampering action.

Optionally, said detecting comprises obtaining readings from a motion sensor of the wearable device to determine a behavioral pattern of the subject that is indicative of an attempt to prevent monitoring of the hand of the subject.

Optionally, the method further comprises: utilizing the wearable device to remove a theft detection tag coupled with the item for sale.

Optionally, said identifying comprises identifying the item for sale based on the visual input and based on a positioning reading of the wearable device.

Optionally, the method further comprises: determining, based on the positioning reading of the wearable device, a subset of a catalog of items; and performing product recognition to identify the item for sale, wherein the product recognition is performed with respect to the subset of the catalog of items.

Optionally, the method further comprises: obtaining a second visual input from the sensor, wherein the second visual input captures a content of a physical tote; determining, based on the virtual cart and on the second visual input, a discrepancy between content of the virtual cart and content of the physical tote; and in response to said determining, performing a second responsive action.

Optionally, the second responsive action comprises at least one of: marking the virtual cart as invalidated and updating the virtual cart based on the second visual input.

Optionally, the wearable device is utilized for manual fulfillment of a shopping order of a customer, wherein the shopping order comprises a list of items; wherein the subject is a picker picking items to fulfill the shopping order of the customer; wherein the action comprises picking up the object and placing the object in a tote associated with the shopping order of the customer; and wherein the responsive action comprises: identifying a corresponding item to the object in the list of items; and marking the corresponding item as fulfilled.

Optionally, the method further comprises: obtaining a second shopping order of a second customer, wherein the wearable device is configured to monitor the picker while the picker fulfills the second shopping order.

Optionally, the wearable device is utilized for manual fulfillment of a shopping order of a customer, wherein the shopping order comprises a list of items; wherein the subject is a picker picking items to fulfill the shopping order of the customer; wherein the action comprises picking up the object and placing the object in a tote associated with the shopping order of the customer; and wherein the responsive action comprises: identifying a mismatch between the object and the list of items; and alerting the subject of the mismatch.

Optionally, the action comprises placing the object; wherein the responsive action comprises: determining a geospatial location of the object after being placed, and updating a mapping of items in a facility to indicate the object is located at the geospatial location.

Optionally, the wearable device comprises a first wearable component and a second wearable component, wherein the first wearable component is configured to be worn on the hand of the subject, wherein the second wearable component is configured to be worn on a second hand of the subject, wherein the sensor comprises a first sensing component located on the first wearable component and a second first sensing component located on the second wearable component, wherein the visual input comprises input from the first sensing component and from the second sensing component.

Optionally, the responsive action comprises: comparing the action with a rule; and in response to a violation of the rule, issuing a safety alert.

Optionally, the rule is related to an administration of medicine to a patient, wherein the subject is administering medicine to the patient, wherein the object is involved in the administration of the medicine, wherein the violation of the rule comprises at least one of: administering a wrong dosage, administering a wrong drug, performing a wrong procedure, administering the medicine to a wrong patient.

Optionally, the wearable device is utilized for monitoring a health-care system, wherein the method further comprises: wherein the subject is a health-care worker, wherein the wearable device is configured to continuously monitor the hand of the subject during treatment of patients; wherein the action comprises a treatment action on a patient.

Optionally, the wearable device is utilized for managing a manufacturing plant, wherein the method further comprises: wherein the subject is an employee on the manufacturing plant, wherein the wearable device is configured to continuously monitor the hand of the subject during a work shift of the subject in the manufacturing plant; wherein the action relating to at least one of: an assembly of a product, wherein the object is a component in the product; an assembly of a product, wherein the object is a tool utilized for the assembly of the product; operating a machine, wherein the object is a component of the machine; and operating a machine, wherein the object is a component of a product processed by the machine.

Another exemplary embodiment of the disclosed subject matter is a wearable device, wherein the wearable device is configured to be worn on a hand of a user, wherein the wearable device comprises: a visual sensor configured to continuously capture an interior portion of the hand, wherein the wearable device is configured to provide images captured by the visual sensor to be utilized to identify an action performed by the hand of the user and to identify an object upon which the action is performed; and a communication unit configured to connect the wearable device to a controller external to the wearable device.

Optionally, activation and de-activation of the wearable device is performed automatically by the controller.

Optionally, the controller is configured to determine a responsive action based on the action or the item.

Optionally, the wearable device is configured to be utilized for self-service shopping, wherein the wearable device is configured to be utilized to identify items grabbed by the hand and moved to or from a physical shopping tote of the user, wherein the items are identifiable based on input of the visual sensor.

Optionally, the wearable device is configured to be associated with a virtual cart upon initiating a self-shopping session, wherein the virtual cart indicates a list of items shopped by the user, wherein the virtual cart is automatically updated based on items moved to and from the shopping cart.

Optionally, the wearable device is configured to be utilized for manual fulfillment of a shopping order of a customer, wherein the shopping order comprises a list of items; wherein the user is a picker tasked with picking items to fulfill the shopping order of the customer; wherein the action comprises picking up the object and placing the object in a tote associated with the shopping order of the customer.

Optionally, the wearable device further comprises a tampering detection module, wherein said tampering detection module is configured to monitor and detect a tamper event during a shopping session of the user, wherein said tampering detection module is configured to avoid monitoring user activity outside the shopping session.

Optionally, the wearable device is a wristband worn on a wrist of the user.

Yet another exemplary embodiment of the disclosed subject matter is a system for a self-service shopping in a store, comprising: a plurality of wearable devices; a control module; a catalog database retaining visual representations of items in the store; and a payment module; wherein each of said plurality of wearable devices is being worn on a hand of a different user and configured to obtain visual input of activity performed by the hand of the different user;

wherein said control module is configured to identify an action made by a user and captured by a wearable device worn by the user, wherein the action is associated with the user modifying content of a physical shopping tote, wherein said control module is configured to update a virtual cart of the user in response to the identification of the action by the user, wherein the virtual cart is updated based on an identification of the item from said catalog database; wherein said control module is configured to invoke said payment module in response to a check-out activity of the user; and wherein said payment module is configured to perform a transaction based on a list of shopped items of the user as indicated in the virtual cart.

Optionally, the system further comprises: an activation module configured to automatically perform activation and de-activation of the wearable device, wherein said activation module is configured to automatically activate the wearable device in response to identifying a check-in activity associated with the user, wherein the wearable device is configured to continuously monitor actions of the user between the check-in activity and the check-out activity.

Optionally, the wearable device comprises a visual sensor configured to continuously capture an interior portion of the hand, wherein the visual input provided by said wearable device module comprises images captured by the visual sensor.

Optionally, said control module is configured to automatically update the virtual cart of the user during the self-shopping session, wherein the update of the virtual cart comprises: automatically adding items to the virtual cart based on items picked up and put into the physical shopping tote of the user, and automatically removing items from the virtual cart based on items removed from the physical shopping tote of the user.

Optionally, the system further comprises: an output interface to be utilized by the user, wherein the output interface is configured to display to the user a content of the virtual cart and to provide an indication of an addition of an item to or removal of an item from the virtual cart.

Optionally, said control module is configured to obtain visual input of the content of the physical shopping tote; wherein said control module is configured to determine, based on the virtual cart and on the visual input of the content of the physical shopping tote, a discrepancy between content of the virtual cart and the content of the physical shopping tote; and wherein said control module is configured to perform a responsive action in response to a determined discrepancy, wherein the responsive action comprises at least one of: marking the virtual cart as invalidated and updating the virtual cart based on the visual input of the content of the physical shopping tote.

Optionally, said control module is configured to identify a placement location of an object, whereby determining a mapping of geo-spatial locations of items in the store.

Optionally, the system further comprises: a tampering detection module, wherein said tampering detection module is configured to monitor and detect a tampering event during the self-shopping session of the user, wherein the tampering event is an event aimed at interfering with monitoring of the hand of the user using the wearable device, wherein said tampering detection module is configured to avoid monitoring user activity outside the shopping session; wherein said control module is configured to perform an anti-tampering action in response to detecting the tampering event.

Optionally, the store is a crowded store, having a ratio between number of people in the store and a floor size of the store above 1:10.

Yet another exemplary embodiment of the disclosed subject matter is a system for a fulfillment of shopping orders in a fulfillment center, comprising: a plurality of wearable devices; a control module; a catalog database retaining visual representations of items in the store; and a payment module. Each of said plurality of wearable devices is being worn on a hand of a different picker and configured to obtain visual input of activity performed by the hand of the different picker. Each picker is tasked with picking items to fulfill a shopping order of a different customer. Said control module is configured to identify a picking action that comprises picking up the object and placing the object in a tote associated with the shopping order of the customer, wherein the picking action is captured by the wearable device. Said control module is configured to identify a corresponding item to the item in the shopping order and mark the corresponding item as fulfilled, wherein the identification of the corresponding item is based on said catalog database. Said control module is configured to invoke said payment module in response to a determination that the shopping order is fulfilled.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
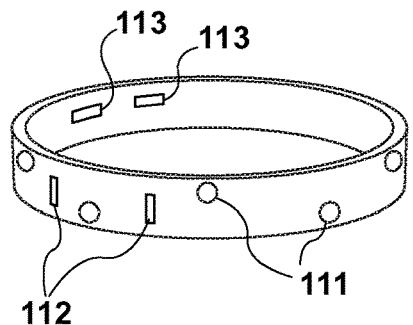
FIGS. 1A-1D show schematic illustrations of a hand action monitoring wearable device, in accordance with some exemplary embodiments of the disclosed subject matter.

One technical problem dealt with by the disclosed subject matter is to enable monitoring actions performed by a human subject without affecting performance of such actions. It may be desired to monitor such actions without violating privacy of the human subject or others in the human subject's environment. The actions may be natural actions, incidental actions, intentional actions, or the like. The actions may be performed by the hand of the human subject, using instruments, tools, or the like. The actions may be performed on objects, on other subjects, or the like.

It is noted that monitoring hand actions may be essential in various disciplines, starting from safety inspection such as in factories, to automating actions such as in self-service shopping. As an example, in self-service shopping, a shopper can enter a store (such as a supermarket, grocery store, fashion store, warehouse, or the like), collect items using her hands and perform other related actions. As such, the shopper may purchase products without being check out by a cashier, without requiring additional scanning of the products before existing the store, or the like.

In some exemplary embodiments, different actions of human subjects may be required to be continuously monitored, in order to maintain safety requirements, to supervise the actions, inspect the actions, or the like. As an example, the action of providing drugs to patients performed by health-care staff, may be desired to be monitored and supervised, in order to verify that a correct dose was provided for a patient, to register the timing of providing the drug, to coordinate between the actions performed by different staff members, such as different nurses in different shifts, observing side effects, or the like.

In some exemplary embodiments, actions may be monitored using sensors, such as cameras, radars, LiDARs, or the like, that observe the human subject. The observing sensors may be located within the environment of the human subject or the location the actions are supposed to be performed. In addition to requiring special equipment and high additional costs, such monitoring may be limited due to limited ability of capturing the actions from different angles, limited ability of tracking the human subject in different locations, limited ability of tracking multiple subjects simultaneously, limited ability in crowded stores or in situations where customers block the view of other customers, or the like. Additionally or alternatively, monitoring the actions using sensors observing the human subject may affect the privacy of the human subject and other subjects in her environment. Specifically, monitoring from afar the human subject can also capture and monitor the subject's private encounters, conversations, or the like. Refereeing to the above mentioned example, monitoring health-care staff may not only violate the privacy of the health-care staff members, but also patients treated thereby.

Another technical problem dealt with by the disclosed subject matter is to provide for a solution that enables a self-service shopping, without the need of expensive additional equipment or changing the structures of the store from the retailer side, and without requiring additional scanning of purchased items from the customer side. Basic self-service shopping solutions may utilize self-checkout machines as an alternative to the traditional cashier-staffed checkout. However, the customer may be still required to stop for check out and even to perform the job of the cashier themselves, by scanning and applying payment for shopped items. Besides being uncomfortable, more complex, and time and effort consuming from the customer side, such solutions may have multiple disadvantages for retailers, such as being vulnerable to shoplifting, mistaken self-checkouts, having partial visibility, more prone to failure, reducing the possibilities for customers and store staff to interact, and adversely affecting customer service in general. Other solutions may enable the customer to purposely scan each product when being picked, e.g., using an on-cart barcode reader, instead of scanning at a self-service cashier. However, even such solutions may be associated with different problems, such as spending time in scanning, being susceptible to shoplifting, multiple scanning errors or inaccurate scanning, or the like.

In some exemplary embodiments, solutions for self-service shopping may be required to automate much of the purchase, checkout, payment steps associated with a retail transaction, or the like. In some exemplary embodiments, some solutions may use a set of cameras and shelves equipped with weight sensors that are configured to identify which products the shopper collects and automatically calculate the bill. Such solutions may require special equipment to be deployed in the store and may not be suitable for Small-Medium Business (SMBs) in view of the high costs, may require the store being in a predetermined structure with no design flexibility, may be configured to work only in clean environments where different objects should be removed (such as signs, ads, or the like), or the like. Besides requiring special equipment and high additional costs, such solutions may be less conformed to the market needs due to issues with the sensors' ability to track multiple users or objects within the store, or additional natural habits of shoppers, such as when children move items to other shelves, when more than one customer has a similar body habitus, cannot be employed in crowded stores, or the like. As an example, other vision-based potential solutions that rely on peripheral scanners, stationary scanners, or the like, and user-tracking may function only with a limited number of shoppers inside the store, such as 1 shopper to a 100 square meters, 5 shoppers to 100 square meters, or the like. A larger number of shoppers may cause a breakdown of such shopper-tracking technologies, as people become too difficult to follow, may have trouble tracking products that are moved from their proper spot on a shelf, view of a customer's activity may be blocked due to other customers in the same area, or the like. Additionally or alternatively, such solutions may be based on the assumption that every item is located in its place at the specific shelf. If a customer takes an item off the shelf, it will be added to the person's virtual cart. If a customer places an item back on the shelf, it is also removed from the customer's virtual cart. Accordingly, if a customer returns an item back to a different location within the store, a confusion may occur, if another customer than picks the same item from that location. Additionally or alternatively, such solutions may have other disadvantages, such as affecting privacy of the consumer, enabling a limited number of simultaneous consumers, or the like.

Yet another technical problem dealt with the disclosed subject matter is identifying and preventing tampering events during self-service shopping. One of the challenging problems associated with self-service shopping, is that in the lack of human monitoring, customers may attempt to rig the system and commit shoplifting. As an example, shoppers may attempt to concealing items from cameras or visual sensors, avoid scanning certain items, or the like. In some exemplary embodiments, self-service shopping solutions may be highly exposed to shoplifting events for multiple reasons, such as that self-checkout theft may be easier to get away with, self-service shopping may be associated with less attention from both employees and other customers, the customer may claim that items taken accidentally or inadvertently, psychological effects such as lack of guilt during to interaction with a machine rather than a human being, lower chances to prosecute, or the like. Self-service shopping solution may be required to detect and alert attempts to steal, to prevent implementation of such attempts, or the like.

Yet another technical problem dealt with the disclosed subject matter is to enable fulfillment of home shopping by human pickers. In some exemplary embodiments, the picker may be tasked with picking items selected by the customer and prepare them for shipment. The picker may pick the items in the store itself, in a storage, in a warehouse, or the like. The picker may be required to read digital or printed orders, including a list of items, pick up the items, place the items in the correct tote associated with each order, transfer the totes for delivery, or the like. Current models of home shopping may involve disadvantages for both the retailers and the customers. On the one hand, the customer may not be able to dynamically update her shopping list, to inspect products before being shipped to her, wrong items may be included in the order and require for the customer's review of the supplied items as well as to contact or the like. On the other hand, the retailer cannot provide an updated items list at each time point for the customer, wrong items may be picked and reduce cost-effectiveness for the retailer, or the like. Additionally or alternatively, pickers may not be able to efficiently fulfill more than one order simultaneously, due to potential mix-ups and confusions.

Yet another technical problem dealt with the disclosed subject matter is handling theft detectors during self-service shopping. In some exemplary embodiments, different retail stores, such as fashion store, libraries, or the like, may utilize electronic article surveillance systems to prevent shoplifting. A theft detector, such as electro-magnetic tags, radio frequency tags, or the like, may be fixed to merchandise and removed or deactivated by the clerks when the item is bought or checked out. However, such systems may force the customer to stop at the checkout in order to remove or deactivate the theft detectors from the items, even during self-service shopping.

Yet another technical problem dealt with the disclosed subject matter is to determine location of objects in changing environments, such as stores, pharmacies, medical centers, factories, fulfillment centers, warehouses, or the like. In some exemplary embodiments, it may be important to determine the exact location of objects, such as for stock-taking, inventory counting, efficiently finding objects, insuring safety, or the like. In some exemplary embodiments, the location of objects may dynamically change, such as due to inadvertent location change by a staff worker, customers placing objects in a non-designated location, human error such as caused by working under pressure, or the like. Determining the location may be critical in such cases and other cases also for safety verification.

One technical solution is to track hand actions using a wearable smart device worn by a human subject. The wearable smart device may be worn on the hand of the human subject, on the wrist of the human subject, or the like. The wearable smart device may be equipped with a vision sensor, such as a digital camera, a radar sensor, a radio waves based sensor, a laser scanning sensor, a LiDAR, an Infrared (IR) sensor, an ultrasonic transducer, or the like. The vision sensor may be configured to observe the interior portion of the hand of the human subject, other portions of the hand of the human subject, an area surrounding the hand of the human subject, a 360 degree view of the hand, or the like. Based on visual input provided by the wearable smart device, the object grasped by the hand, and the action performed thereon, may be identified, and a responsive action may be performed accordingly.

In some exemplary embodiments, the wearable smart device may be a device that can be worn on human's hand without affecting actions performed by the hand, such as a bracelet, a wristband, a watch, or the like. However, other hand wearables may be utilized such as a glove that covers all or part of the hand (e.g., a few fingers, a finger cover), or the like. Additionally or alternatively, the wearable smart device may be embedded in a smart watch or other wearable device of the human subject being observed. The wearable smart device may be worn in a single hand, in both hands separately, in both hands simultaneously, or the like.

It is noted that in some embodiments, a body-worn device that is not worn on the hand may be utilized. As an example, the device may be worn on a collar, on a torso, or the like, while having view of the hand. Such embodiments may be less reliable than hand-worn devices, and may be susceptible to manipulations by the subject. In case of pickers and other staff members, such devices may be utilized when considering that the subject is considered reliable.

In some exemplary embodiments, the wearable smart device may be configured to identify when the hand of the human subject touches an item, picks the item up, moves the item from one location to another, releases the item, places the item, pressing on the item, unwrapping the item, or the like. The device may be further configured to identify the item being touched by the hand(s), such as the type of the item, shape, name, or the like. Additionally or alternatively, the wearable smart device may be configured to identify other attributes related to the item, such as weight, size, temperature, texture, or the like. In some exemplary embodiments, the wearable smart device may be configured to identify when the action that the hand(s) perform on an item (e.g., touches, holds, grabs, releases, or the like) based on the visual input provided by the vision sensor. The wearable smart device may be configured to identify the item using the visual input. As an example, the device may be configured to identify the item based on an optical image, based on QR code, barcode, any combination of letters, numbers or images, or the like. In some exemplary embodiments, computer vision techniques may be employed to analyze the images. The image analysis may be performed on-device. Additionally or alternatively, off-device analysis may be implemented, such as to preserve battery and reduce computation requirements from the device, or the like.

In some exemplary embodiments, the wearable smart device may be configured to identify in real-time, a target destination in which the object is being placed in during the shopping, such as a bag, a shopping cart, the hands of the subject, or the like. The visual input of the wearable smart device may be analyzed to identify a surface on which the object is being placed, a predetermined shopping cart such as a physical shopping cart of the store, a personal shopping bag, or the like. In some exemplary embodiments, the wearable smart device may be configured to identify a candidate shopping cart, and validate such candidate to be the shopping cart during the shopping session, such as based on additional visual input, such as later visual input, or the like. As an example, in response to identifying a container in which a first object is placed on, the container may be determined to be a candidate shopping cart. In response to identifying that other objects are being placed in the container by the subject, the container may be validated as the shopping cart. As another example, the container may be determined to be a component in the shopping carts, such as a bag placed inside the shopping carts, a section in a divided shopping cart, or the like. As yet another example, the target destination may be the customer's hands, which may be considered a container. As yet another example, the container may be determined as a temporary shopping cart upon moving objects placed therein to a different shopping cart. In some exemplary embodiments, the identified shopping cart may be container that is unique and was never before used as a shopping cart. For example, the customer's personal bag may be a unique bag that was never encountered before. The shopping cart may be identified by first identifying it as a candidate due to it being a container. In view of repetitive insertion of items to the candidate, in view of the candidate being in the view of the sensor during the shopping session over time, or in view of other considerations, the shopping cart candidate may be validated. It may be noted that the shopping cart may dynamically change during the shopping session, such as because of placing objects in different containers during the shopping session, keeping the objects in the hands for a while before being placed in the shopping cart, or the like. A virtual shopping cart may be updated to be associated with each determined shopping cart utilized during the shopping session. An additional validation may be performed to determine that the virtual cart comprises a correct combination of items purchased by the subject and placed in different containers.

In some exemplary embodiments, the one or more sensors may be functionally coupled to a learning module, such as implemented using Artificial Neural Networks (ANN), supervised learning, or the like, configured to analyze photos captured by the sensors and infer information therefrom. Additionally or alternatively, the wearable smart device may comprise a chip or another hardware technology configured to receive, collet and process pictures, videos signals, or the like as captured from the sensors of the wearable smart device. Additionally or alternatively, the retail smart wristband may comprise a transmitter utilized for transmitting input captured by the sensors of the wearable smart device to a backend solution. Such transmitter may use Wi-Fi, Bluetooth, or the like for transmitting the data.

In some exemplary embodiments, the subject may be required to wear two wearable smart devices, one on each hand, in order to monitor actions of the two hands of the subjects. In some exemplary embodiments, a single wearable device that comprises two components that can be disconnected may be utilized. The single wearable device may be worn by the subject on one hand, or can be divided into the two components each of which may be worn on a different hand. Each component may be associated with a sensor that may be configured to continuously monitor the respective hand and provide visual input thereof.

Another technical solution is utilizing the wearable smart device for retail uses. The wearable smart device may be worn by a customer to identify items being collected by the customer. In some exemplary embodiments, the wearable smart device may be configured to identify when the customer's hand touches an item, picks the item up, moves the item, releases the item, places the item on a shopping bag or a shopping cart, places the item back to a location in the store, or the like. The device may be configured to identify a shopping cart in which purchased items are being placed therein, such as based on analysis of the customer's environment, analysis of the customer's behavior, analysis of movement patterns of the customer, or the like. The device may be further configured to identify the item being touched by the customers' hand(s), such as the type of the item, shape, name, or the like. Additionally or alternatively, the device may be configured to identify other attributes related to the item, such as weight, number of units in the package, size, expiry date, or the like. The device may be personal, e.g., a property of the customer that may be adapted to fit to any store that the customer enters, or a property of the store, that may be provided to each customer that enters the store and personalized or paired to the customer accordingly.

In some exemplary embodiments, when a customer enters a store, the customer may put the wearable smart device on. The wearable smart device may be automatically or manually synchronized to the mobile phone of the customer, to identify the store (e.g., in case of the device belonging to the customer) or the customer (e.g., in case of the device being property of the store). The wearable smart device may be configured to identify any item that the customer picks up and puts into the shopping bag or cart, keeps it within his hand, moves to the other hand, put in a different shopping bag, or the like. A digital shopping list may be automatically created, updated and checked without the need for stopping at checkout point, or being re-reviewed an item by an item, or the like.

Additionally or alternatively, when a customer enters a store, the customer may receive a container, herein referred to as a shopping cart, that connects to the wearable smart device, or is otherwise associated therewith. The shopping cart may comprise a wireless communication module enabling direct communication with the device (e.g., via Bluetooth), indirect communication therewith (e.g., via a Wi-Fi, via the Internet, or the like), or the like. Additionally or alternatively, the shopping cart may comprise a screen that interfaces to the wearable smart device and displays the items being added to the cart, the total cost of the shopped items, or any other information related to the items. The shopping cart interface may be utilized to verify that the item that the customer is being charged is entered into the correct bill, e.g., to prevent a situation that the customer is being charged for an item not inserted into the shopping cart (as an example, when the customer helps another shopper, picks an item from the floor, picks an item from a different cart, enters the item to a wrong cart, or the like). Additionally or alternatively, a mobile application may be utilized to provide a similar display to the user.

In some exemplary embodiments, the wearable smart device may be configured to identify when the customer's hand(s) perform an action on an item (e.g., touches, holds, grabs, releases, or the like) based on touch contact between the device and the item, the device and other items, or the like. As an example, the device may comprise pressure sensors that may be located on certain locations thereof that may be in contact with the items, such as three fingers (e.g., on the thumb, index finger and middle finger), or the like. The device may identify, using the pressure sensors that the customer's hand holds an item, releases the item, or the like. For example, existence of pressure may be indicative of the customer holding the item, while lack of pressure may indicate that the item is released. Additionally or alternatively, the device may comprise accelerometer sensors, configured to identify and monitor the movement of the hand. The device may be configured to identify that the item is being held, moves, inserted into the cart, or the like, based on the movement pattern of the customer's hand. It may be noted that the pressure sensors or the accelerometer sensors may be utilized for determining additional attributes of the item, such as weighing using the pressure sensors, size and number using the accelerometer sensors, or the like. Additional sensors may be utilized, such as, temperature sensors, scanners, or the like In some exemplary embodiments, based on the visual input, the item and the action being performed thereon may be identified. The device may comprise a vision sensor such as a camera, an IR sensor, a radar, a LiDAR, an ultrasonic transductor, electro-magnetic waves-based sensor, a laser-based sensor, a visible-light based sensor, an invisible light-based sensor, a combination thereof, or the like, that provides visual representation of the item. It is noted that the visual input may be a visual representation as would be captured by a human being, data that is computationally processed to generate an image (e.g., by an imaging process), or the like. The device may be configured to identify the item using the visual data. As an example, the device may be configured to identify the item based on an optical image, based on QR code, barcode, an identifier of the item, such as a combination of numbers, letters, icons, or the like. In some exemplary embodiments, computer vision techniques may be employed to analyze the images, such as object recognition techniques, image analysis techniques, machine learning, or the like. In some exemplary embodiments, the image analysis may be performed on-device. Additionally or alternatively, off-device analysis may be performed to preserve battery and reduce computation requirements from the device.

In some exemplary embodiments, the device may comprise location sensors that may be configured to identify the item and the action based on the location of the item. The exact location of the item may be determined by a triangulation of known locations inside the store, using a three dimensional mapping of the store shelves, or the like. In some exemplary embodiments, location sensors may be Radio Frequency (RF)-based, may be based on GPS, may be based on cellular towers, indoor-beacons, or the like. In some exemplary embodiments, the location sensors may be adapted for indoor usage, such as may be based on triangulation of signals provided within the store by designated hardware. Additionally or alternatively, tagging techniques may be utilized to identify an item. As an example, a Radio Frequency Identification (RFID) sensor may be utilized to read RFID information from a tag embedded in or coupled to the item. The RFID information may comprise an indication of the identity of the tagged item, such as a barcode, a sequence of letters, numbers, icons, or the like. As another example, a location of the item may be identified based on a recognition of shelves inside the store, such as based on an identifier of a shelf the item is located thereon, an identifier of an adjacent shelf, recognition of the area the shelf is located therein, or the like.

In some exemplary embodiments, the device may be configured to apply computerized learning to improve the identification of items based on features that can be learned from sensors, such as shape, weight, temperature, or the like, or the type of the action, such as based on the movement pattern, acceleration, or the like. The information may be verified using the scanner or camera (such as inside the stores) to accurately identify the item.

In some exemplary embodiments, the device may comprise one or more anti-tampering measures so that it is possible to know whether a customer is removing (such as intently or non-intently) during shopping. In view of such determination, it may be assessed whether the customer is trying to steal, whether the content of the shopping cart is correctly captured by the corresponding virtual cart, or the like. In some exemplary embodiments, using input from the sensors of the device, the store system may identify that the customer removed the device and inserted an item to the cart. In some exemplary embodiments, the anti-tampering measures may be hardware or software measures implemented in the device and configured to detect an attempt to remove the wearable device, to block view of the sensors of the wearable device, to block communication of the wearable device, or the like. In some exemplary embodiments, a tamper detection system, such as disclosed in U.S. Pat. Nos. 9,629,420, 8,547,222, 8,831,627, 5,959,533, U.S. Patent Application Publication 2011/0,109,461, U.S. Pat. Nos. 7,098,792, 5,650,766, 5,298,884 all of which are incorporated by reference in their entirety without giving rise to disavowment. In some exemplary embodiments, anti-tampering detection may be performed only after the check-in process is performed and until checkout is completed. In some exemplary embodiments, once the customer leaves the store (e.g., indicated by a geo-fence, identified using a specific beacon, or the like), tampering detection may be disabled. The customer may be allowed to remove the device. Additionally or alternatively, during such time actions of the customer may no longer be tracked and monitored. In some exemplary embodiments, anti-tampering detection and analysis may be disabled during bathroom breaks, such as when the customer exits an active shopping area, but before the customer completed her purchase. Once the customer returns to the active shopping area, analysis and anti-tampering may be re-enabled. Additionally or alternatively, a second check-in process may be performed when the customer re-enters the active shopping area to ensure that the device is active.

Yet another technical solution is utilizing the wearable smart device for determining geospatial location of objects in changing environments. In response to determining based on the visual input of the wearable device that the object was picked from one location and placed in another location, a mapping of items in a facility may be updated to indicate the object is located at the other location. As an example, the wearable device may be utilized by the store staff, such as by the retailer, the workers, or the like, in order to create a three-dimensional mapping of the products in the store. The device may be worn by the workers when arranging the products in the store. The three-dimensional mapping may be utilized for multiple uses, such as for identifying the items based on their location, for store uses such as stock check, or the like. Additional information may be fed to the device by the worker during the arrangement, such as the barcode, information about the item, new items, or the like. Additionally or alternatively, input may be provided via a secondary device, such as a terminal connected to the device, a mobile app coupled to the device, or the like.

Yet another technical solution is utilizing the wearable smart device for removing or deactivating theft detectors. In some exemplary embodiments, the device may comprise a component that is configured to legally disable the theft detector component, such as a magnet for lowering the buzzer, deactivation pad, or the like. When the component is used, the system may identify the product for which the theft detector is disabled. The identified product may be considered as purchased, and may be added to the list of products purchased. A financial transaction may be performed, enabling a seamless self-shopping experience, that ensures that items are not shoplifted and paid for.

Yet another technical solution is utilizing the wearable smart device for manual fulfillment of a shopping order of a customer by a picker. In some exemplary embodiments, the shopping order may comprise a list of items selected by the customer, such as in an on-line shopping platform, in a website of the retailer, or the like. A picker that picks items for the customer may wear the smart wearable device. The visual input obtained from sensors located on the wearable device to identify when the picker picks up an object and places it in a tote associated with the shopping order of the customer. A corresponding item matching the object in the list of items may automatically be marked as fulfilled. Additionally or alternatively, in response to identifying a mismatch between the object and the list of items, such as that the object is not comprised by the list of items, the picker may be alerted of the mismatch. Additionally or alternatively, the picker may perform multiple picking tasks for multiple customers simultaneously. The picker may utilize multiple wearable devices, each of which associated with a different customer and paired to a respective tote within the cart. Additionally or alternatively, the picker may utilize a single wearable device. In some exemplary embodiments, it may be identified into which tote the item was placed, and accordingly update the corresponding customer order, so that the same picker may pick items for multiple customers simultaneously. It may be noted that the wearable device for the manual fulfillment of a shopping order of a customer by a picker, may be configured to be worn on other organs of the picker, such as on the chest, collar, forehead or otherwise mounted on the head of the picker, or the like, in a manner enabling capturing actions of the hands of the picker. Such embodiments may provide a wider scene capturing the hand actions and the objects, being more comfortable for the picker when fulfilling multiple orders simultaneously, or the like. In such embodiments, concerns such as violating privacy of the picker, preventing identification of the customer, or the like, may not be influential.

Yet another technical solution is utilizing the wearable smart device for safety verification. The hand action identified based on the visual input may be compared with a safety rule to determine conformation or violation thereof. In response to a violation of the safety rule, a safety alert may be issued to the subject, to a supervisor, or the like. As an example, the safety rule may be a rule relating to an administration of medicine to a patient, such as a type of the medicine, a dosage, a procedure of administration, prevention of mixture with other medications, allergies or sensitivity for drugs of the patient, or the like. As another example, the safety rule may be a rule relating to operating a machine, a vehicle or the like, such as rules related to operating an airplane, a rule associated with pressing each button, or the like. Additionally or alternatively, the wearable smart device may be utilized for other verification process, such as monitoring a series of actions of the hand compared to predetermined rules, order of the actions, or the like. As an example, the rule may be related to an installation of a product, based on a series of actions on different components that should be performed in a certain order to provide a functional product. Yet another technical solution is utilizing the wearable smart device for monitoring a health-care system. In some exemplary embodiments, a health-care worker may be required to wear the wearable smart device. The wearable device may be configured to continuously monitor the hand of the health-care worker during treatment of patients. Each determined action may be automatically reported along with the patient information, results or objects associated with the action, or the like. As an example, in response to a routine set of actions performed by a nurse, a set of measurements, such as a blood pressure, body temperature, or the like, may be automatically registered in the patient medical report, along with the time of performing the action, identifier of the nurse, or the like. As another example, the action may be administrating a medicine to a patient. The responsive action may be reporting the administration, along with properties thereof, such as type, dosage, or the like, to enable monitoring medication administration for the patient, side effects, or the like. Additionally or alternatively, the responsive action may be preventing violation of safety rules. As an example, the health-care worker may be administrating a wrong medicine, a wrong dose, a wrong medical operation, or the like, on the patient. The responsive action may be to alert the health-care worker of such mistake. Additionally or alternatively, the responsive action may be to alert another health-care worker to assist the health-care worker. Additionally or alternatively, the responsive action may automatically prevent the administration of the wrong medical operation or medicine, such as blocking an intravenous (IV), preventing the medicine to reach the patient, halting medical devices utilized for performing the operation, or the like.

One technical effect of utilizing the disclosed subject matter is enabling an efficient hand action tracking without violating privacy of monitored subjects and surrounding subjects. The disclosed subject matter may enable monitoring mainly the interior portion of the hand, while a wider scene may be blocked by the hand. Personal identification features, such as in the face, name tags, or the like, may not be captured by the utilized sensors. Furthermore, the data obtained by sensors utilized in the disclosed subject matter may be limited and focused only on information essential for determining the action and the object the action being performed on. The disclosed subject matter may spare tracking and monitoring the entire environment (such as the entire store, the entire hospital room, the entire lab, or the like), and thus reducing costs, not requiring changes in the design or additional equipment, not revealing sensitive data in the environment, or the like.

Another technical effect of utilizing the disclosed subject matter is providing for a reliable self-checkout shopping service, with an enhanced user experience for customers in retail stores. Utilizing the disclosed subject matter enables the customer to perform a fast and efficient self-service shopping, while reducing the time that the consumer spends at the store by avoiding waiting in line, avoid scanning of items, reducing billing time, or the like.

Furthermore, the disclosed subject matter provides economic benefits to the customers, as the disclosed subject matter enables maintaining competitiveness in the market, reduce labor costs and increase profitability of retailers which may lead to lowering prices, or the like. Additionally or alternatively, the disclosed subject matter provides a seamless shopping experience, lacking a feeling of actual payment. The disclosed subject matter provides such benefits while preserving the privacy of consumers, with no intrusive tracking of the consumer, without capturing face or personal images, or the like.

Yet another technical effect of utilizing the disclosed subject matter is providing for a healthier self-shopping experience. Utilizing the disclosed subject matter enables avoiding the health risk associated with waiting in lines for check-out points, minimizing physical interaction with store workers, only the customer touches the items while shopping, the customer uses her shopping bag, no need to physically pay using cashier machines or passing money or card to other people, or the like. By providing such benefits, the disclosed subject matter contributes to prevention of spreading infectious diseases, lower viral contagion, and the like.

Yet another technical effect of utilizing the disclosed subject matter is providing for a reliable self-checkout shopping service, with an affordable price to the retailer side. By enabling an improved consumer shopping experience, the disclosed subject matter may improve consumer attraction and satisfaction, leading to more consumers hiding the retailer store. By reducing the purchase time for each consumer, additional consumers can be served.

Furthermore, the disclosed subject matter enables redeploying staff personnel to enhance direct customer service, maximum floor space, saving labor costs, or the like.

Yet another technical effect of utilizing the disclosed subject matter for the retailer side, is enabling the service in crowded stores without limiting the number of shoppers that can simultaneously shop in the store. While regular cashier-free stores, such as stores providing self-service shopping based on in-store monitoring equipment, may operate with a limited number of customers inside the store, such as because one customer may block the view of other customers, block the view of the monitoring equipment, or the like; the disclosed subject matter may enable self-service shopping also in crowded store, such as stores with a maximal number of customers that can fit in.

Yet another technical effect of utilizing the disclosed subject matter is providing for a manner of collecting data by the consumers, that may be utilized for advertising and enhancing business plans, without bothering the consumers or harming their privacy. The data collected by the disclosed subject matter may be utilized to improve store operations and checkout experience, to merge consumers online and offline identities, to re-target shoppers online based on in-store purchases, to learn shopper interests and habits, to learn consumers' reaction to various shelf displays and store layouts, or the like. Additionally or alternatively, the data collected by the disclosed subject matter may be utilized to extract data useful for retailer operation. As an example TRAX™ is a system the employs computer vision technology, artificial intelligence, fine-grained image recognition, and machine learning engines to convert store images into shelf insights. As an example, TRAX™ is able to recognize products that are similar or identical, such as branded drinks or shampoo bottles but can also differentiate between them based on variety and size. One effect of the disclosed subject matter may be to collect visible data that can be used to be analyzed by TRAX™ or other similar products, without the need to send dedicated personal or sensors. Instead, the data is collected in a crowd-sourcing methodology and as a side-effect to the customers' and pickers' regular activities.

Yet another technical effect of utilizing the disclosed subject matter is detecting and preventing shoplifting events during shopping. By utilizing the disclosed subject matter, every item picked by the consumer may be automatically calculated to be paid for. The consumer may be devoid of controlling or deactivating the monitoring during the shopping session (e.g., no button, a disabled button, or the like), any attempt to remove the wearable device or hide view of sensors thereof may be detected and alerted, or the like.

Yet another technical effect of utilizing the disclosed subject matter is automatically generating an accurate store-wide mapping of items and their locations. In some cases, the mapping may be generated automatically and iteratively according to actions of clerks, pickers, shoppers, or the like, and reflect in real-time and accurately the location of each item in the store.

Yet another technical effect of utilizing the disclosed subject matter is to automatically provide for a safety system that monitors human activity and identifies violations of safety rules. Such system may achieve a reduction in accidents and incidents caused due to human error.

The disclosed subject matter may provide for one or more technical improvements over any pre-existing technique and any technique that has previously become routine or conventional in the art. Additional technical problems, solutions and effects may be apparent to a person of ordinary skill in the art in view of the present disclosure.

Referring now to FIG. 1A showing a schematic illustration of a hand action monitoring wearable device, in accordance with some exemplary embodiments of the disclosed subject matter.

In some exemplary embodiments, Wearable Device 110 may be a wearable digital product that may be worn on hand's wrist, such as a smart watch, smart wristband, or the like. Wearable Device 110 may be adapted in size and shape to fit to a human hand or wrist. Wearable Device 110 may be worn on the left hand, on the right hand, on a single hand, on both hands (e.g., comprising two wristbands, one on each hand), or the like. Additionally or alternatively, Wearable Device 110 may be embedded in another wearable device of the user, such as a smart watch, a bracelet, or the like.

In some exemplary embodiments, Wearable Device 110 may comprise one or more Sensors 111 located thereon. Sensors 111 may be embedded in Wearable Device 110, attachable thereto, or the like. Sensors 111 may be configured to cover a full range of view around the hand, such as 360°. Additionally or alternatively, Sensors 111 may be positioned at a location enabling capturing a view of the inner portion of the hand, the palm of the hand, the base portion of the fingers, or the like, such that when a subject is holding an object, Sensors 111 may capture the object being held, at least partially. Additionally or alternatively, Sensors 111 may be located at the base of the palm, at the wrist, or the like. Sensors 111 may be in a predetermined constant distance from each other, may overlap, or the like. Additionally or alternatively, Sensors 111 may be dispersed non-uniformly over Wearable Device 110, in order to provide the full range of view, provide a view enabling identification of actions and items, or the like. As an example, more sensors of Sensors 111 may be located in the portion of Wearable Device 110 that is configured to face the interior portion of the hand. In some exemplary embodiments, Sensors 111 may comprise visual sensors such multiple camera lenses, different cameras, LiDAR scanners, ultrasonic transductors, RF-based sensors, other sensors or components having alternative or equivalent technology, a combination thereof, or the like. Sensors 111 may be configured to capture pictures, videos or signals around Wearable Device 110. Other types of input may be provided, such as heat maps, thermal images, or the like. Additionally or alternatively, Sensors 111 may comprise motion sensors or detectors configured to recognize any movement of Wearable Device 110 and support tracking disposition of an item. Additionally or alternatively, Sensors 111 may comprise a barcode scanner configured to support identification of an item.

In some exemplary embodiments, Wearable Device 110 may be utilized to recognize that the subject wearing Wearable Device 110 is about to perform an action (or is performing the action) on an item, to identify the item being held, information thereabout, or the like. Wearable Device 110 may be utilized to track actions of the hand being worn thereon, items the hand performs or avoids performing the action thereon, or the like. Sensors 111 may be configured to recognize when the hand is approaching an object, picking, holding (e.g., the object stays constant at the hand), moving the object (e.g., background picture changed), releasing the object, or the like. Additionally or alternatively, Sensors 111 may be configured to identify parameters of the item or enable identification thereof, such as type, category, name, shape, size, price, or the like. In some exemplary embodiments, Wearable Device 110 may be configured to identify a hand-based action that is not intended as a command to the device itself (e.g., a gesture intended as a purposeful command). As an example, Wearable Device 110 may be utilized to identify a picking up action performed naturally, as opposed to a purposeful gesture with the hand that may be performed specifically with the intent to instruct the device.

In some exemplary embodiments, Wearable Device 110 may be configured to identify actions that are performed as part of the regular interaction of the subject with the items, and no dedicated actions or gestures by the subject are relied upon.

In some exemplary embodiments, Sensors 111 may comprise one or more motion sensors or detectors. Input from the motion sensors may be utilized to support tracking disposition of items upon which the hands perform actions. The motion sensors may be configured to recognize any movement of Wearable Device 110.

Additionally or alternatively, Sensors 111 may comprise a barcode scanner. Barcode scanner may be utilized to scan barcodes associated with items to support identification thereof, provide additional information, such as price, weight, or the like.

Additionally or alternatively, Wearable Device 110 may comprise an Analysis Component 113, such as a chip or another hardware technology, configured to receive, collet and process pictures, videos signals, or the like captured by Sensors 111. Additionally or alternatively, Analysis Component 113 may be a transmitter utilized for transmitting input captured by Sensors 111 to a backend device configured to perform the respected analysis. Such transmitter may be configured to utilize a wireless connection, such as Wi-Fi network, Bluetooth, RF transmission, IR transmission, or the like, for transmitting the data. It may be noted that all functionalities of Wearable Device 110 (and similarly 120, 140, 160 and 170) may be based on on-device computations or on off-device computations, such as performed by an edge device, a remote server, a cloud-based server, or the like.

Additionally or alternatively, Wearable Device 110 may be configured to provide an output to the subject or other user, such as for informing that the item is identified. As an example, a green light may be lightened as positive signal. Other types of signals, such as audio signals, vibration signals, or the like, may be used. Such signals may be provided using an Output Component 112, such as a small screen, a microphone, a Light Emitting Diode (LED), or the like. In some exemplary embodiments, Output Component 112 may be configured to provide output to the subject (e.g., LED lighting up in green) indicating of an update of her virtual cart, such as in view of an addition of an item thereto. Additionally or alternatively, Output Component 112 may be configured to provide output to the subject (e.g., LED lighting up in red) indicating of an invalidating of her virtual cart, such as in view of an misidentification of an item in the shopping cart, identification of a tampering event, placing an item in a wrong shopping cart, or the like.

In some exemplary embodiments, Wearable Device 110 may comprise a Buzzer Deactivator 114. Buzzer Deactivator 114 may be configured to enable activating and deactivating of a theft detector associated with items, such as in stores, pharmacies, or the like. As an example, an employee in a shop may utilize Buzzer Deactivator 114 for activation of the theft detector and embedding of item's details, such as: item description, bar code, price, or the like, besides to physically attaching the theft detector to the item. As another example, a shopper may utilize Buzzer Deactivator 114 for deactivating the theft detector physically attached to the item, physically remove it from the item (if applicable), or the like.

In some exemplary embodiments, each of the wearable devices depicted in FIGS. 1A-1D, such as Wearable Device 110 may be utilized as a retail smart device. Wearable Device 110 may be configured to be worn by a shopper during self-service shopping, may be configured to be worn by a picker fulfilling an online order, by a retailer or an employee placing stock, or the like. As another example, the device may be worn by a cashier during checkout activity, such as to scan the products and create the digital shopping list. Additionally or alternatively, Wearable Device 110 may be utilized for other tasks, such as safety monitoring, augmented reality games, virtual reality applications, or the like.

Figure 1B:
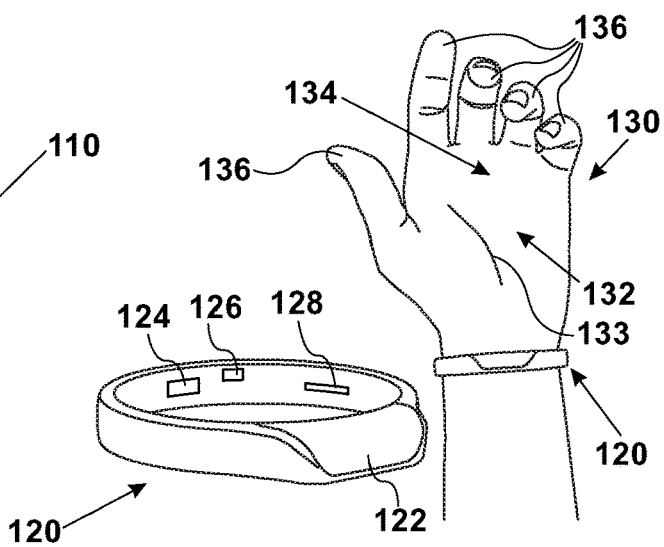

Referring now to FIG. 1B showing a schematic illustration of a hand action monitoring wearable device, in accordance with some exemplary embodiments of the disclosed subject matter.

In some exemplary embodiments, Wearable Device 120 may be another embodiment of the hand action monitoring wearable device. Similar to Wearable Device 110, Wearable Device 120 may be adapted in size and shape to fit to a human hand or wrist, may be worn on the left hand, on the right hand, on a single hand, on both hands may be embedded in another wearable device of the user, or the like. As an example, Wearable Device 120 may be worn on the wrist of Hand 130.

In some exemplary embodiments, Wearable Device 120 may be configured to continuously monitor Hand 130 between a check-in and check-out activities. Such monitoring may comprise obtaining and analyzing input related to Hand 130, such as visual input, geospatial location, or the like.

In some exemplary embodiments, Wearable Device 120 may comprise a Visual Sensor 122 configured to continuously capture Hand 130. Visual Sensor 122 may be configured to capture at least an Interior Portion 132 of Hand 130. Interior Portion 132 may comprise Distal Portion 134 of a Palm 133. Visual Sensor 122 may be configured to face Palm 133 whereby capturing Distal Portion 134. The visual input may capture at least a portion of the object when the object is being held by Hand 130, such as when being grasped by Fingers 136 of Hand 130, or the like. At least a portion of the visual input of Visual Sensor 122, such as about 5%, about 10%, about 50%, may comprise a view of Interior Portion 133 to enable identification of the object.

It may be noted that a view of Visual Sensor 122 may be blocked, at least in part, by Hand 130. As a result, Visual Sensor 122 may not be enabled to capture the whole environment surrounding Hand 130, such as the face of the user, other people in the surrounding environment, unrelated objects, or the like. Additionally or alternatively, the view of Visual Sensor 122 may be a spherical view capturing 360 degree panoramic space surrounding Hand 130. In some exemplary embodiments, the spherical view may have a relatively limited view, such as a spherical view with a radius of up to about 10 centimeters around Hand 130, up to about 25 centimeters around Hand 130, or the like.

In some exemplary embodiments, Visual Sensor 122 may be positioned on a protrusion of Wearable Device 120, distancing Visual Sensor 122 from the surface of Hand 130. Such placement may be useful for preventing the view to be blocked by the base of the Palm 133.

In some exemplary embodiments, Wearable Device 120 may be configured to provide images captured by Visual Sensor 122 to be utilized to an Analysis Module 124. Analysis Module 124 may be configured to identify an action performed by Hand 130 and to identify an object upon which the action is performed. Analysis Module 124 may be embedded within Wearable Device 120 or may be located on a device external thereto, such as on a server, a backend device, or the like.

In some exemplary embodiments, Wearable Device 120 may comprise a Communication Unit 126 configured to connect Wearable Device 120 to a controller (not shown) external to Wearable Device 120. The controller may be configured to determine a responsive action based on the action or the item. The responsive action may be associated with the purpose of monitoring actions of Hand 130, such as reporting the action or the object, calculating a check based on the action and the object, issuing an alert based on the action or the object, or the like.

In some exemplary embodiments, Wearable Device 120 may be devoid of a de-activation interface for the user. Activation and de-activation of Wearable Device 120 may be performed automatically by the controller. In some exemplary embodiments, power source (not shown) of Wearable Device 120, such as battery, may be sealed and the subject may not have access thereto. Additionally or alternatively, Wearable Device 120 may be provided with a limited de-activation interface for the user, that enables the user to de-activate Wearable Device 120 upon finishing a shopping session, based on permission from the controller, or the like.

In some exemplary embodiments, Wearable Device 120 may be configured to be utilized for self-service shopping. Wearable Device 120 may be configured to be utilized to identify items grabbed by Hand 130 and moved to or from a physical shopping tote of the user, wherein the items are identifiable based on input of Visual Sensor 122. Wearable Device 120 may be configured to be associated with a virtual cart upon initiating a self-shopping session. The virtual cart may indicate a list of items shopped by the user. The virtual cart may be automatically updated based on items moved to and from the shopping cart by Hand 130. In some exemplary embodiments, Wearable Device 120 may comprise a Tampering Detection Module 128. Tampering Detection Module 128 may be configured to monitor and detect a tamper event during a shopping session of the user. Tampering Detection Module 128 may be configured to avoid monitoring user activity outside the shopping session.

Additionally or alternatively, Wearable Device 120 may be configured to be utilized for manual fulfillment of a shopping order of a customer. The shopping order may comprise a list of items. Hand 130 may be of a picker tasked with picking items to fulfill the shopping order of the customer. Wearable Device 120 may be configured to identify actions of picking up an object by Hand 130 and placing the object in a tote associated with the shopping order of the customer.

Additionally or alternatively, Wearable Device 120 may be configured to be utilized for protecting the user or other related subjects. The responsive action determined based on the input of Visual Sensor 122 may comprise comparing the action performed by Hand 130 with a safety rule. In response to a violation of the safety rule, a safety alert may be issued. Additionally or alternatively, Wearable Device 120 may be configured to be utilized for monitoring a health-care system. Wearable Device 120 may be configured to continuously monitor the hand of health-care workers during treatment of patients.

Figure 1C:
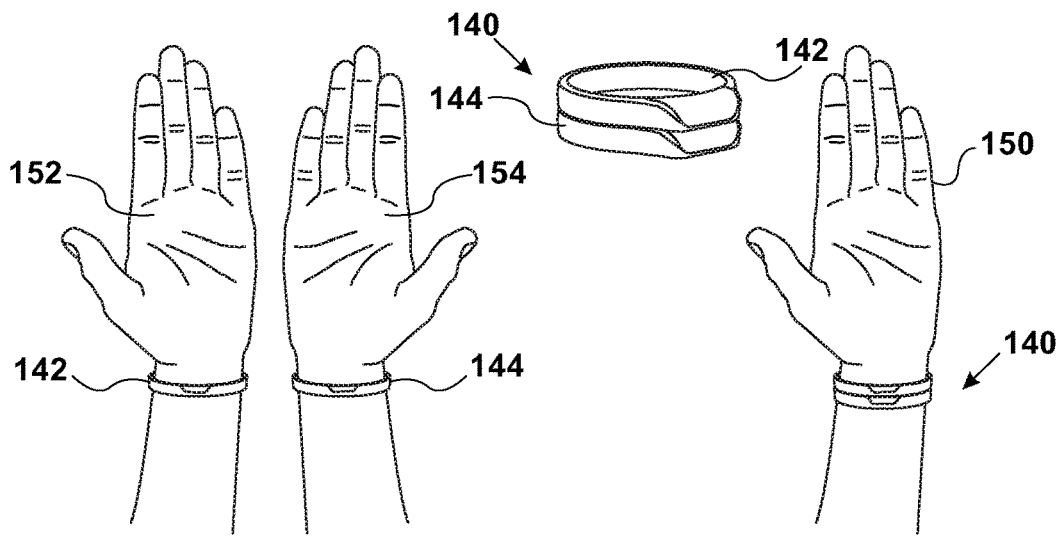

Referring now to FIG. 1C showing a schematic illustration of a hand action monitoring wearable device, in accordance with some exemplary embodiments of the disclosed subject matter.

In some exemplary embodiments, Wearable Device 140 may be another embodiment of the hand action monitoring wearable device. Wearable Device 140 may comprise a First Wearable Component 142 and a Second Wearable Component 144. First Wearable Component 142 and Second Wearable Component 144 may be connected in a manner allowing detaching one from the other, re-connecting therebetween, or the like. As an example, the two components may be connected using magnetic force, using a physical connector, or the like. Additionally or alternatively, the two components may be placed adjacently to one another but remain decoupled. First Wearable Component 142 may be configured to be worn on a First Hand 152. Second Wearable Component 144 may be configured to be worn on a Second Hand 154. First Hand 152 and Second Hand 154 may belong to a single user such as a left hand (142) and a right hand (144), to two different related users, such as two users shopping together, or the like. Each of Wearable Component 142 and Second Wearable Component 144 may be configured to monitor First Hand 152 and Second Hand 154, respectively, as independent wearable device. However, the analysis of visual input provided thereby to determine the action and object, may be performed uniformly on a combination of visual inputs of each component.

In some exemplary embodiments, First Wearable Component 142 may comprise a First Sensor 143 (or multiple sensors as in Wearable Device 110). Second Wearable Component 144 may comprise a Second Sensor 145 (or multiple sensors as in Wearable Device 110). The visual input utilized to determine the actions and the associated object may comprise both input from First Sensor 143 and from Second Sensor 145. Additionally or alternatively, First Wearable Component 142 and Second Wearable Component 144 may be synchronized, the visual input provided by First Sensor 143 and from Second Sensor 145 may be combined and provided by one of the two components, or the like. Additionally, or alternatively, the analysis of the two visual inputs may be inter-connected. For example, in view of products and locations identified based on one device, the computations associated with the analysis of the input from the second device may be modified. As an example, using the view from one device, a potential location of the user may be determined, and the set of potential items that can be captured in the second device may be determined based on the location, and utilized when analyzing the input from the second device.

Additionally or alternatively, both First Wearable Component 142 and Second Wearable Component 144 may be worn together on a single Hand 150. In such a case, Wearable Component 140 may be configured to act similar to Wearable Device 120 (or Wearable Device 110, in case of comprising multiple sensors).

Figure 1D:
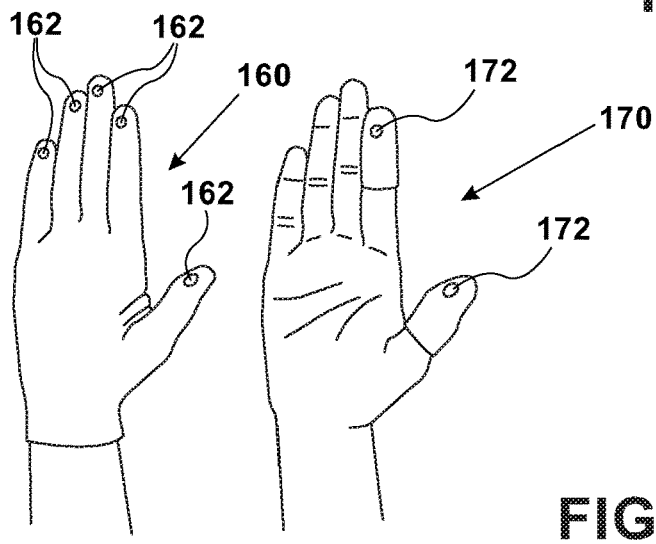

Referring now to FIG. 1D showing schematic illustrations of a hand action monitoring wearable device, in accordance with some exemplary embodiments of the disclosed subject matter.

In some exemplary embodiments, Wearable Device 160 and Wearable Device 170 may be embodiments of the hand action monitoring wearable device. Wearable Device 160 may be of a shape of glove configured to be worn on a hand of a user. Wearable Device 160 may comprise one or more Sensors 162 located on the inner side of one or more of the fingers.

In some exemplary embodiments, Sensors 162 may comprise visual sensors (such as in Sensors 111 and Visual Sensor 122) configured to capture at least an interior portion of the hand, such as the palm, the portion between the palm and the fingers, the portion between the palm and the wrist, or the like. Sensors 162 may be configured to capture at least a portion of the object when the object is being held by the hand.

In some exemplary embodiments, Wearable Device 160 may be configured to provide visual input (or other types of input) captured by Sensors 162. An action performed by the hand an object upon which the action is performed may be determined based on the visual input (or the other types of input). In some exemplary embodiments, Wearable Device 160 may comprise a communication unit (not shown) configured to connect Wearable Device 160 to a controller (not shown) external to Wearable Device 160. The controller may be configured to determine the action, the item, a responsive action based on the action or the item, or the like.

In some exemplary embodiments, Wearable Device 160 may comprise other sensors located on other portions of the hand, such as a thermometer, an accelerometer, a gyroscope, a weight sensor, or the like.

Additionally or alternatively, Wearable Device 170 may be of a shape of one or fingers cap configured to be worn on one or more fingers of a hand of a user. Wearable Device 170 may comprise one or more Sensors 172 located on the inner side of one or more of the fingers which upon Wearable Device 170 is worn. Sensors 172 may comprise visual sensors (such as in Sensors 111, Visual Sensor 122, Sensors 162) configured to capture at least an interior portion of the hand, such as the palm, the portion between the palm and the fingers, the portion between the palm and the wrist, or the like. Sensors 172 may be configured to capture at least a portion of the object when the object is being held by the hand.

In some exemplary embodiments, other embodiments of the wearable device may be utilized, such as a device configured to be worn on the chest of the user, embedded in a vest to be worn by the user, a hat shaped device configured to be worn on the head of the user, a device configured to be worn on the forehead of the user such as using elasticized straps, or the like. Such wearable devices may also comprise visual sensors (such as in Sensors 111 and Visual Sensor 122) configured to capture at least an interior portion of the hand of the user, objects being held by the hand user actions performed by the hands of the user, or the like.

Figure 2:
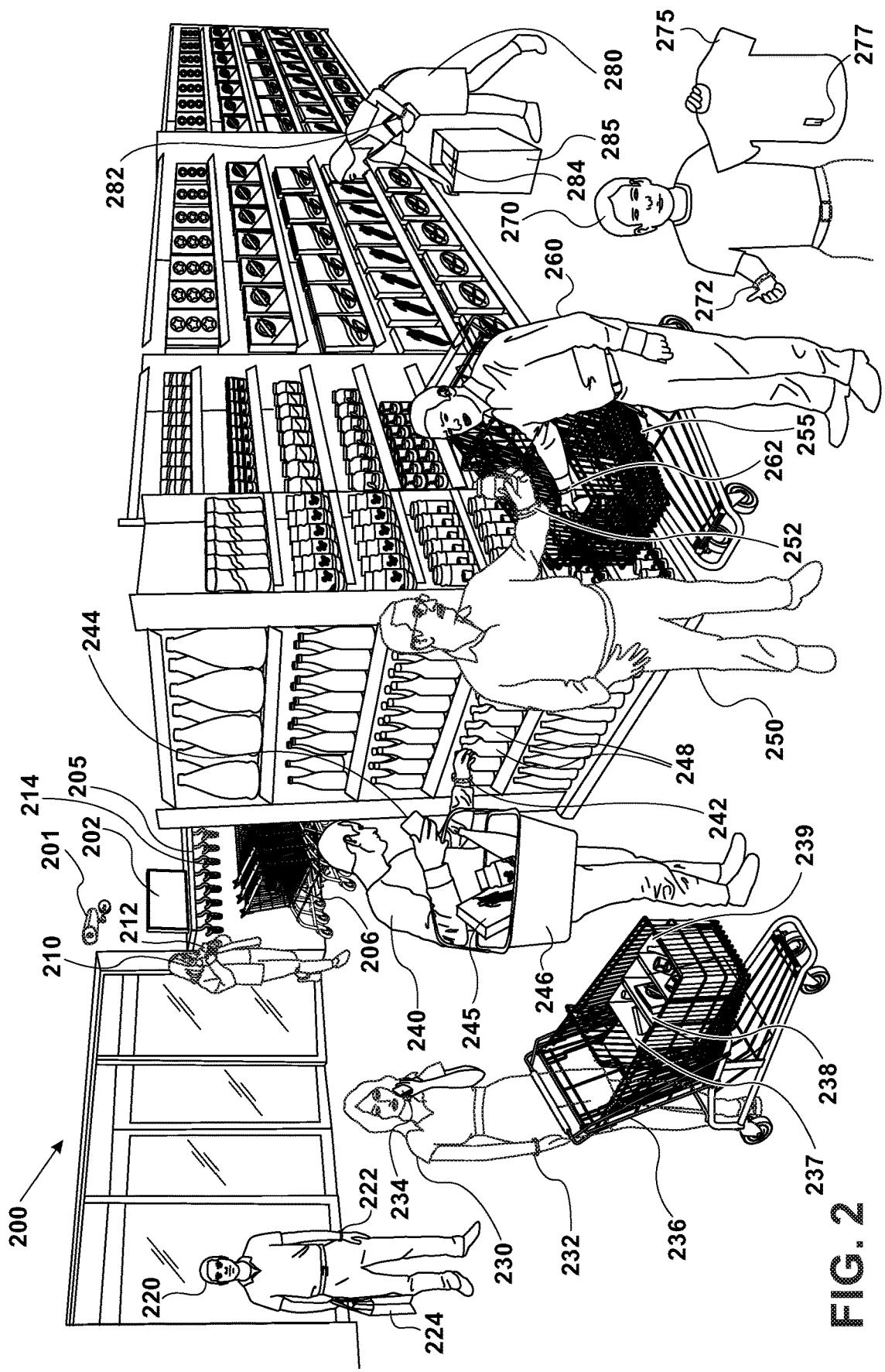
FIG. 2 shows a schematic illustration of an exemplary self-service shopping scheme, in accordance with some exemplary embodiments of the disclosed subject matter.

Referring now to FIG. 2 showing a schematic illustration of an exemplary self-service shopping scheme, in accordance with some exemplary embodiments of the disclosed subject matter.

In some exemplary embodiments, a Retail Store 200 may provide a self-service shopping, using smart wearable devices, such as Wearable Device 110, 120, 140, 160, and 170, or the like. It is noted that all functionalities of the smart wearable devices may be based on on-device computations or on off-device computations, such as performed by an edge device in Store 200, a remote server, a cloud-based server, or the like.

In some exemplary embodiments, when a Customer 210 enters Store 200, or checks into a system of Store 200 (such as by using a Mobile Device 212 or otherwise), Customer 210 may receive one or more retail smart wristbands, such as Wearable Device 214, from Store 200. In some exemplary embodiments, Store 200 may have a designated location (205) where wearable devices are placed and await to be picked up by customers, similarly to the location of the Available Carts 206. In some exemplary embodiments, in Location 205, the wearable devices may be charged, to ensure they have sufficient power level. Wearable Device 214 may be affiliated or assigned to Customer 210 for the duration of the shopping session. Customer 210 may be requested to pair or synchronize Wearable Device 214 to a device thereof, such as through a designated mobile app of Mobile Device 212, by registering to an account associated with Store 200, by scanning Wearable Device 214 using a Scanner 201, or the like. After the relevant pairing, each action performed with the hand(s) of Customer 210 wearing Wearable Device 214 may be attributed to the account of Customer 210.

Additionally or alternatively, the shopper, such as Customer 220, may utilize his personal Wearable Device 222 to perform self-service shopping in Store 200. When Customer 220 enters Store 200 while wearing Wearable Device 222, Wearable Device 222 may be configured to recognize that Customer 220 has entered Store 200, and may synchronize with the store's system. As an example, Wearable Device 222 may connect to the Wi-Fi of Store 200, and accordingly recognize Store 200. As another example, Wearable Device 222 may be preconfigured to recognize Store 200 and connect to systems thereof. As yet another example, Wearable Device 222 may be manually paired with systems of Store 200, such as by scanning an identifier thereof using Scanner 201, pairing with a shopping cart from Available Carts 206, or the like. As yet another example, Wearable Device 222 may be paired to a mobile device of Customer 220, which may be utilized to manually check in Store 200, may connect via a respective mobile app, or the like. Additionally or alternatively, a geo-fence associated with Store 200 may be used to detect entering and exiting Store 200. Wearable Device 222 may be configured with geo-fence or location-based activation. Wearable Device 222 may be activated when Customer 220 enters Store 200, by using geo-fence feature or other signal to a mobile app, or directly to Wearable Device 222, which may activate Wearable Device 222. It may be noted that as Wearable Device 222 is the shopper's property (e.g., not received in the course of check-in to Store 200), the process of check in may activate or turn on Wearable Device 222, and then each action performed with the hands wearing Wearable Device 222 within the store will be attributed to Customer 200. Furthermore, Customer 220 may utilize a personal Shopping Bag 224 instead of a shopping cart of Store 200, for environmental purposes, for convenience, in order to perform faster shopping, or the like.

In some exemplary embodiments, upon entering Store 200, a physical barrier (not shown) may prevent customers from entering the shopping area before performing a check-in activity. As an example, a carousel barrier may prevent the customer from entering until the customer completes a pairing of her wearable device. After the check-in activity is completed, monitoring of the activity of the customer may commence.

In some exemplary embodiments, each wearable device may be utilized to continuously monitor actions of the shopper wearing the wearable device during the shopping session. The monitoring may be performed continuously between the check-in activity and a respective checkout activity. In some exemplary embodiments, Wearable Device 222 may be configured to provide information to the owner of Store 200 only with respect to the shopping session within Store 200. As an example, if Customer 220 uses Wearable Device 222 in several stores, each store may gain an access to information relating to visiting the respective store only and not to information relating to other stores. In some exemplary embodiments, analytics and general information may be tracked by a general service provider, who may not necessarily be affiliated to any specific store.

In some exemplary embodiments, a Customer 240 may be wearing a Wearable Device 242 during shopping in Store 200. Sensors of Wearable Device 242 may be configured to capture at least an interior portion of the hand of Customer 240 wearing Wearable Device 242, and provide visual input thereof. Wearable Device 242 may be configured to identify each item that Customer 240 performs an action with (such as picking, holding, putting in a shopping bag or cart, or the like), based on the visual input. As an example, Wearable Device 242 (or an associated software thereof, on-device or in a back-end) may be configured to identify that Customer 240 picks up Object 245, and place it in Shopping Bag 246. Additionally or alternatively, Wearable Device 242 may be configured to utilize additional types of input to identify the object and the action, such as positioning readings of Wearable Device 242, accelerometer readings of Wearable Device 242, or the like. In response to detecting the object and the action performed thereon by Customer 240, Wearable Device 242 (or the associated software thereof) may be configured to update a virtual cart of Customer 240 to include Object 245. Additionally or alternatively, Wearable Device 242 may be configured to determine, such as based on a series of visual inputs over time, that Customer 240 has decided not to purchase Object 245. As an example, determining that customer 240 removed Object 245 from Shopping Bag 246, placed Object 245 back to its location, to another location in Store 200, or the like. In response to such determination, Wearable Device 242 (or the associated software thereof) may be configured to update the virtual cart of Customer 240 to exclude Object 245. In some exemplary embodiments, the virtual cart may be displayed for Customer 240, such as using Mobile Device 244, or the like. Additionally or alternatively, the virtual cart may be retained by systems of Store 200 and sent to Customer 240 upon finishing the shopping session. Additionally or alternatively, Wearable Device 242 may be configured to emit an auditory cue such as a beep, or a visual output such as a green light, or the like, indicating the addition (or removal) of an object to the virtual cart.

In some exemplary embodiments, some actions or objects may be unidentified or recognized. In such case the system output may "disqualify" or invalidate the entire virtual cart. As an example: the analysis software that is configured to analyze the visual input and determine the action, may not be able to analyze certain actions such as: picking an item from the floor, moving an item from one cart to another, which will cause such disqualification, or the like. Additionally or alternatively, if the visual sensor captures a view of the content of Shopping Bag 246 and an unknown item is identified therein, the virtual cart may be disqualified.

Additionally or alternatively, the smart wearable device may be configured to identify removal or tampering thereof during the shopping. As an example, Wearable Device 242 may be configured to detect any tampering event aimed at interfering with monitoring of the hand of Customer 240. Wearable Device 242 may be configured to detect removal of Wearable Device 242, blocking view of the sensors embedded in Wearable Device 242, hiding an object with another object, or the like. Wearable Device 242 may utilize input readings from other sensors thereof, besides the visual sensors, such as readings of an accelerometer thereof, to determine a behavioral pattern of Customer 240 that is indicative of an attempt to prevent monitoring of the hand of Customer 240. Additionally or alternatively, Wearable Device 242 may comprise a detector or sensor that is configured to identify an attempt or action for tampering or removing Wearable Device 242. Additionally or alternatively, Wearable Device 242 may be configured to emit a heart-beat signal to indicate that it is active. In case the heart-beat signal is not received for a predetermined time window, such as one minute, 10 seconds, or the like, it may be determined that the device was tampered with, deactivated, depleted its power source, or the like. In some exemplary embodiments, such event may be considered a tampering event. In response to detecting a tampering event, Wearable Device 242 may be configured to perform an anti-tampering action, such as issuing an alert, indicating a staff member of Store 200, or the like. It may be noted that Wearable Device 242 may be configured to perform such detection only during the self-service shopping session of Customer 240. After activation (e.g., check-in activity) of Wearable Device 242, any attempt to remove or actual tamper or removal of Wearable Device 242 may be signaled to the system, and may cause the shopping bag or cart to be disqualified. The anti-tampering feature may automatically be turned to operating mode when the Wearable Device 242 is activated or paired and may automatically be turned off or enter a sleeping mode when Wearable Device 242 is deactivated (e.g., check-out activity). Customer 240 may be enabled to perform a tampering event after the self-service shopping session ends without resulting in the anti-tampering action.

Additionally or alternatively, the visual input of Wearable Device 242 may be supported with visual input capturing the content of Shopping Bag 246. Such input may be also captured by Wearable Device 242, such as when placing objects in Shopping Bag 246, when being positioned above Shopping Bag 246, or the like. Identification of objects purchased by Customer 240 may be supported and validated based on the input capturing Shopping Bag 246. In response to a discrepancy between the content of the virtual cart and content of Shopping Bag 246, the virtual cart may be invalidated. Additionally or alternatively, the virtual cart may be updated accordingly. Additionally or alternatively, the virtual shopping cart may be validated based on input from sensors located on or embedded in Shopping Bag 246, such as weighting sensors, cameras, or the like. Additionally or alternatively, the visual input of Wearable Device 242 may be utilized to recognize when an item is accidently put in a wrong cart, such as by identifying that the item has been placed in a shopping cart different than Shopping Bag 246 associated with the customer, by determining that the location in which the item is placed is different than Shopping Bag 246, or the like. In some exemplary embodiments, Customer 240 may be notified of the misplacement of the item, may be requested to re-place the item in Shopping Bag 246, or the like. Additionally or alternatively, an additional shopping bag may be determined to be associated with Customer 240 in addition to Shopping Bag 246. In some exemplary embodiments, when Customer 240 leaves Store 200, he will be invoiced for the items which were picked up when the hand wearing Wearable Device 242, and placed in Shopping Cart 246, without scanning the items. The payment may be made using a payment solution integrated with or embedded in a mobile app on a Mobile Device 244 of Customer 240 and supported by backend system of Store 200. In response to identifying a check-out activity of the subject, performing a transaction based on content of the virtual cart of the subject. Additionally or alternatively, Shopping Cart 246 may be inspected by the retailer before Customer 240 leaving Store 200, such as for validation thereof, in tampering suspected cases, or the like.

In some exemplary embodiments, a Picker 230 may utilize Wearable Device 232 for manual fulfillment of shopping orders of customers, such as on-line orders. Each customer may provide a list of items to be purchased. The list of order may be viewed to Picker 230 via a screen, such as on a Computing Device 234 managing such orders. Picker 230 may pick items listed in the list of items to fulfill the shopping order of the customer. Wearable Device 232 may be configured to identify when Picker 230 picks up an object and place it in a tote associated with the shopping order of the customer. In response to identifying a corresponding item to the object in the list of items, such corresponding item may be automatically marked as fulfilled.

In some exemplary embodiments, Picker 230 may fulfill multiple orders simultaneously, one after the other, or the like. Picker 230 may obtain multiple shopping orders of different customers. The items of each shopping order may be picked and placed in a tote associated with the customer. As an example, Cart 236 may comprise three different totes (237, 238 and 239) each of which utilized to pick a shopping order of a different customer. Picker 230 may obtain a combined list of items sorted according to their location in Store 200 to enable faster collecting of the items. Each item in the combined list may be marked to indicate the relevant customer. Wearable Device 232 may be configured to monitor Picker 230 while fulfilling each shopping order. Picker 230 may be enabled to configure Wearable Device 232 to the relevant customer whenever switching between the orders. Additionally or alternatively, Wearable Device 232 may be configured to identify to which customer the item belongs based on identifying the tote in which the item is placed. Wearable Device 232 may be configured to provide visual input capturing the tote that the item is being placed therein, an identifier thereof, such as a barcode, an identifying color, or the like.

In some exemplary embodiments, two customers may be enabled to shop together in one shopping cart and one bill, such as Customer 250 and Customer 260. Wearable Device 252 worn by Customer 250 and Wearable Device 262 worn by Customer 260, may be synchronized to a single account. In some exemplary embodiments, Wearable Device 252 and Wearable Device 262 may be components divided from a single wearable device, such as First Wearable Component 142 and Second Wearable Component 144 of Wearable Device 140 depicted in FIG. 1C. Additionally or alternatively, Wearable Device 252 and Wearable Device 262 may be separated wearable devices that are both paired to the same customer account, virtual cart, or the like. Each object picked by Customer 250 or by Customer 260 may be added to a single combined virtual cart. In some cases, Customer 250 and Customer 260 may utilize a single Shopping Cart 255 to place the purchased objects, however, multiple shopping carts or bags may be utilized. In some exemplary embodiments, such an embodiment may enable a shopping experience of a family, of a husband and wife, of a parent and his children, or the like.

In some exemplary embodiments, the wearable device may be utilized for removal of theft detector. The wearable device may be utilized for self-service purchase in retail stores, where items are protected from theft, such as fashion items which are protected with a magnet needle. As an example, Customer 270 may utilize Wearable Device 272 worn thereby during self-service shopping in Store 200 to remove or disable an Anti-Theft Component 277 from an Item 275. Wearable Device 272 may be configured to deactivate, physically disconnect, turn off, or otherwise disable an anti-theft Component 277 from Item 275. In some exemplary embodiments, Anti-Theft Component 277 may be attached to Item 275 and pre-configured to the system of Store 200. In some exemplary embodiments, Anti-Theft Component 277 may be configured to signal description of Object 275 to Wearable Device 272. In some exemplary embodiments, Anti-Theft Component 277 may be activated or deactivated by Wearable Device 272. In order to complete a purchase of Item 275 and pay for it, Customer 270 may have to deactivate Anti-Theft Component 277 using Wearable Device 272. Such deactivation may be performed before Customer 270 leaves Store 200 or elsewhere, as determined by the store. Customer 270 may be invoiced for Item 275 after deactivating anti-Theft Component 277. In some exemplary embodiments, the system may wait a predetermined amount of time or until Customer 270 is indicated as leaving Store 200 to send a bill, so as to gather all purchases together and send a single bill. Additionally or alternatively, a Worker 280 of Store 200 may configure the theft detector for the item, by implementing in the theft detector the respective item details, including description, bar code, price, or the like. The theft detector removing component may be embedded in Wearable Device 272, may be a different wearable item, or the like.

Additionally or alternatively, the wearable device such as Wearable Device 282 may be utilized by the retailer or workers of Store 200, such as Worker 280, for different purposes, such as arranging Store 200, stocktaking, mapping locations of objects within Store 200, determining the exact location of each item in Store 200, inventory checking, verification of the quantities and condition of items in Store 200, mapping shelfs in Store 200, or the like. or the like. Wearable Device 282 worn by Worker 280, may be configured to follow each object being held by Worker 280 from its position at a Delivery Box 285 to the shelves of Store 200. Visual input from different wearable devices utilized in Store 200, or other sensors monitoring Store 200, such as Camera 201, may be matched to enable the system to draw the structure Store 200. After the system learns the structure of Store 200, the system may be configured to map the location of each item put by Worker 280 on the shelves. The system may have a virtual map of the entire Store 200 together with the items put on their shelves or arranged elsewhere in Store 200. Wearable Device 282 may be configured to identify an action of placing an Object 284. In response, Wearable Device 282 may be configured to determine a geospatial location of Object 284 after being placed, and updating a mapping of items in Store 200 to indicate that Object 284 is located at the geospatial location. Additionally or alternatively, when a shopper takes an item from a shelve, the wearable device of the shopper may be configured to recognize the shelf (such as when the shopper wrist is close to that shelf). Such feature may assist with identifying the item, which the system has prior knowledge of its location on that shelf, from monitoring the store arrangement, or the like. Mapping of the shelves may be supported by unique identifiers (such as stickers) which may be pasted on, or otherwise affixed to the shelves' fronts. The shelves may be marked such as using a 2D mapping of aisle number and shelf number in the aisle. Additionally or alternatively, each shelf may be divided into cells creating a 3D mapping. Each shelf or shelf cell may have a unique identifier (such as combination of letters and numbers) which may ease the process of Wearable Device 282 in mapping Store 200 and further recognition of the exact location of Wearable Device 282 when used by Worker 280, or other wearable devices worn by shoppers. In some exemplary embodiments, the identifier may provide an approximated location. The approximated location may be of size of about 1 meter×1 meter×1 meter, or the like. Additionally or alternatively, the approximated location may be of size of about 80 cm in width, 30 cm in depth and 30 cm in height. The measurements may be based on the size of the shelf, such as the height of the shelf, the depth of the shelf, or the like. In some exemplary embodiments, the approximated location may be utilized to reduce complexity of identifying the item. For example, based on the approximated location, potential items that are retained in the approximated location (or nearby locations) may be known and may be used as the "immediate suspects" for matching when the shopper picks up an item. Determining whether the picked up item is a specific item is potentially an easier computational task than attempting to identify which item it is when compared to a database of thousands of items. In some exemplary embodiments, matching may be performed with respect to a first repository having a small number of items that are located nearby, and with respect to a second repository having all potential items in the store. A reduced confidence level may be sufficient for matching an item in the first repository in comparison to the minimal confidence threshold required for the second repository. Additionally or alternatively, the matching process may take into account the image together with the distance between the item and the approximated location, such as increasing likelihood of matching when the item is stored nearby the approximated location. In some exemplary embodiments, items that are usually retained in one place may be naturally moved by shoppers to other places that are still nearby.

In some exemplary embodiments, a database or a catalog of items may be retained by the system managing the self-service shopping using the wearable devices. Prior to activating the solution, all items which may be sold in Store 200 may be pictured from different angels, categorized and stored in a designated database, e.g., a catalog database. When the system (through a wearable device) recognizes that the hand(s) made an action or got close to an object, the picture, video or signal of the item may be matched with the database, and identified thereof (or not identified, if such object is not listed in the database or matching has not succeeded). Additionally or alternatively, a partial database may be utilized for each store. The partial database may comprise items that are known to be in the store in a certain location. In order to speed the wearable device's identification of an object, instead of searching the entire database each time, only the items, which the service is aware of being located in the location of the wearable device, based on positioning readings thereof, may be searched. In case that the system does not find the object in that partial database, the system may search the whole database for that object. The system may be configured to know what items are located in Store 200 based on an inventory list obtained from different wearable devices worn by customers, from Wearable Device 282, from the relevant Point of Sale (PoS) used at the store, other solution managing the store's inventory, or the like. Each item that is located in Store 200 may be identified and listed in the partial database of the store.

In some exemplary embodiments, the wearable devices may be configured provide an audio guide to items' locations at Store 200. The audio guide may be utilized for shopping assistance for blind persons or persons suffering from partial blindness or low vision. As an example, the system may utilize a shopping list of Customer 240 for that purpose. Wearable Device 242 may be paired Mobile Phone 244 of Customer 240. An audio system of Wearable Device 242 may be configured to vocalize the parameters of the object which is identified by Wearable Device 242 (such as name, price, or the like). Customer 240 may be able to listen to these parameters through the app's voice feature of Wearable Device 242, via Mobile Device 244, or the like.

In some exemplary embodiments, the system utilizing the wearable devices may be configured to learn shoppers' behavior in general, such as the ways and methods for choosing, picking, holding, moving, releasing items, or the like, the unique way of each shopper to perform these actions, or the like. Such learning may be performed using machine learning or other techniques. Learning shoppers' behavior may reduce false signals or portion of undefined shopper's actions. Additionally or alternatively, the wearable device may be configured to learn properties of the items, such as shape, from different angles, and improve the identification of the items to minimize false or non-identifications.

In some exemplary embodiments, there may be multiple of customers in Store 200. Some of which may utilize wearable devices, and some may not. In some exemplary embodiments, some of the customers may conduct self-service shopping while other may conduct traditional shopping which also comprise manual scanning of the items, e.g., by a cashier during check-out.

Figure 3:
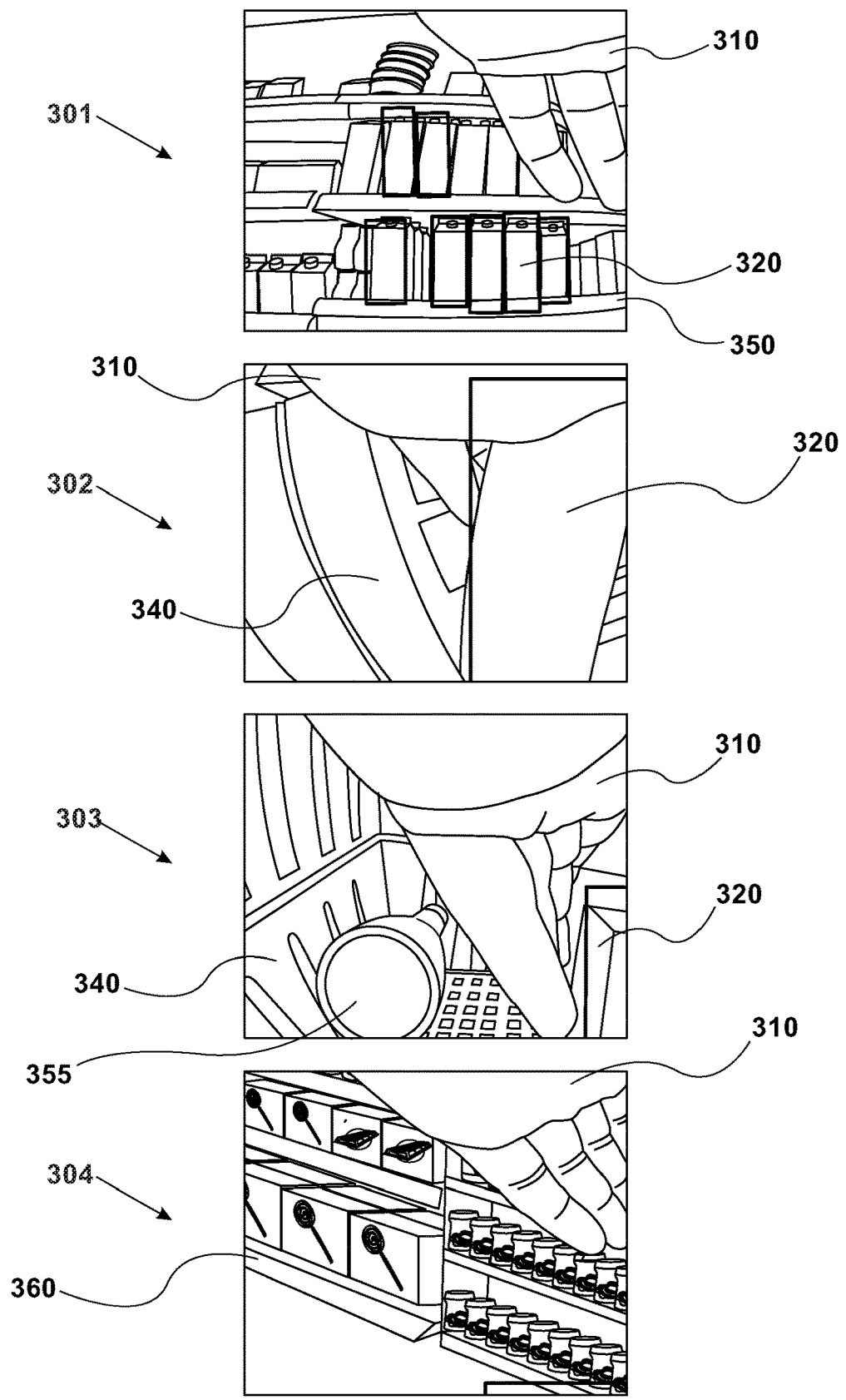
FIG. 3 shows schematic illustrations of visual inputs provided by a hand action monitoring wearable device, in accordance with some exemplary embodiments of the disclosed subject matter.

Referring now to FIG. 3 showing schematic illustrations of visual inputs provided by a hand action monitoring wearable device, in accordance with some exemplary embodiments of the disclosed subject matter.

In some exemplary embodiments, a wearable device, such as 110, 120 or 140 depicted in FIGS. 1A-1C, may be worn on a Hand 310 of a subject. The wearable device may comprise one or more sensors configured to capture at least an in interior portion of Hand 310. In some exemplary embodiments, the wearable device may be configured to be worn on a wrist of Hand 310, whereby positioning the sensor to face a palm of Hand 310, or at least a distal portion thereof, such that enabling to capture at least a portion of an object when the object is being held by Hand 310, or when being grasped by fingers of Hand 310, or the like.

In some exemplary embodiments, the sensors may be configured to provide visual input that at least a portion thereof comprises a view of the interior part of Hand 310, such as Images 301, 302, 303 and 304. As an example, Image 301 captures a view of Hand 310 in front of a Shelf 350 within the store, with portion of the objects on the shelf, such as Object 320. As another example, Image 302 captures a view of Hand 310 placing Object 320 in a Basket 340. As yet another example, Image 303 captures Hand 310 along with a portion of Basket 340, that comprises other objects picked by the user, such as Object 355. As yet another example, Image 304 captures a different view of Hand 310 being free from any object, while approaching other items in the store such as Object 360. It may be noted that different images may capture different views associated with Hand 310. However, at least a portion of the image (such as about 5%, about 10%, about 50%, or the like) may comprise a view of the portion of Hand 310. Such portion may vary from one image to another, based on the angle of Hand 310, the position thereof, the action being performed thereby, or the like. As an example, Image 301 captures a smaller portion of Hand 310 comparing to Image 302.

In some exemplary embodiments, the view of the sensor may be blocked, at least in part, by Hand 310. As an example, in Image 302 and Image 303, the view of the sensor is limited to a portion of Basket 340, without showing the external environment thereof.

In some exemplary embodiments, the wearable device may be configured to recognize when Hand 310 is getting close to an item (such as Object 320), picking, holding (e.g., the object remains being held by Hand 310), moving it (e.g., background picture changed), releasing an item, or the like.

The identification of Object 320 and the actions performed thereon may be identified based on the visual input, such as Images 301-304. As an example, based on Image 301, the wearable device may be configured to recognize that Hand 310 is about to perform an action on Object 320, based on identifying that Hand 310 getting close to Object 320, and picking it. Based on Image 302, it may be identified that Hand 310 is holding Object 320 and moving it towards Basket 340. Based on Image 304, it may be identified that Hand 310 is releasing Object 320 and putting it in Basket 340. In Image 304, Hand 310 may be identified to be free again and ready to pick another item.

Additionally or alternatively, Images 301-304 may be utilized to identify the item being held, or about to be held by Hand 310. Image analysis techniques may be applied to identify Object 320. Object 320 may be recognized based on a catalog of items of the store, such as by comparing portions of Object 320 with the catalog of items. Additional information may be determined about Object 320, such as the type, category, name, shape, weight, size, or the like, such as by identifying parameters on Object 320, identifying the location of Object 320, or the like. Additionally or alternatively, a positioning reading of the wearable device, indicative of the location thereof, may be obtained, such as using a location sensor thereon, a location system of a device associated therewith, or the like. A subset of a catalog of items of the store may be determined based on the location, such as based on an input from the store, or the like. As an example, the subset of the catalog may comprise items located on Shelf 350, items located in the fridge comprising Shelf 350, diary items, or the like. A product recognition may be performed to identify Object 320 with respect to the subset of the catalog of items.

In some exemplary embodiments, visual input capturing the content of Shopping Bag 340, such as Image 302 and Image 303, may be utilize to validate the virtual cart associated with the customer. The content of Shopping Bag 340 may be identified based on the images, and compared to the virtual cart being updated during the shopping session. In response to determining a discrepancy between content of the virtual cart and content of Shopping Bag 340, the virtual cart may be invalidated, updated based on the images, or the like. As an example, Object 355 may be identified in Image 303, while not be listed in the virtual cart. Accordingly, the virtual cart may be updated to include Object 355 or an identifier thereof.

In some exemplary embodiments, the visual input may comprise portions of the store in which the shopping session is being performed. As an example, Image 301 captures a Shelf 350 and Image 304 captures Shelf 360. Such images may be analyzed to recognize the shelf, such as based on an identifier thereof, a sticker pasted thereon, based on a prior knowledge of the location of the associated object on that shelf, from monitoring the store arrangement, or the like. As an example, based on prior knowledge of the location of Object 320, Shelf 350 may be identified. Additional action may be performed based on identifying the shelves, such as updating inventory of the respective store to indicate that Object 320 is purchased, maintaining the mapping of objects in the store, extracting additional information related to Object 320, such as offers or sales, expiration date, temperature (based on the type of the shelf, the shelf being in a refrigerator or a freezer, or the like), or the like.

Figure 4A:
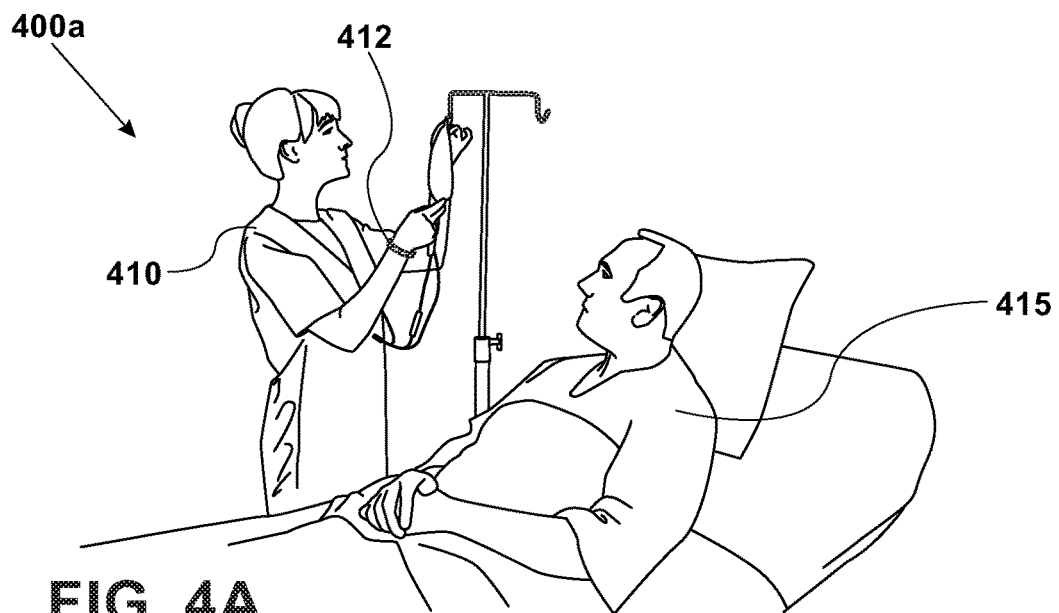
FIGS. 4A-4C show schematic illustrations of exemplary environments in which the disclosed subject matter may be utilized, in accordance with some exemplary embodiments of the disclosed subject matter.

Referring now to FIG. 4A showing schematic illustrations of exemplary environments in which the disclosed subject matter may be utilized, in accordance with some exemplary embodiments of the disclosed subject matter.

In some exemplary embodiments, the disclosed subject matter may be utilized for monitoring a health-care system, such as in Health-care Facility 400a. A Wearable Device 412, such as 110, 120, or 140 depicted in FIGS. 1A-1C may be configured to be worn by a healthcare worker, such as Nurse 410. Wearable Device 412 may be configured to continuously monitor actions of Nurse 410 during treatment of patients, such as Patient 415. Wearable Device 412 may be configured to identify an action performed by the hands of Nurse 410 during treatment of Patient 415, such as administrating a medicine to Patient 415 using an intravenous. Wearable Device 412 may be configured to identify the object upon which the action being performed, e.g., the intravenous tube, the medication Nurse 412 is adding to the intravenous, or the like. Based on the input provided by sensors of Wearable Device 412, additional parameters of the action and the objects may be determined, such as the type of the medication, the medication dose being flushed to intravenous bag, the initial amount of fluids in intravenous bag before adding the medication, or the like. Other parameters and features may be determined based on the previous parameters, such as the rate in which the medication is being flushed through the intravenous tubing, or the like.

In some exemplary embodiments, the action identified to be performed by Nurse 410 using Wearable Device 412, may be compared with a safety rule relating to an administration of medicine to a patient, such as administering a wrong dosage, administering a wrong drug, performing a wrong procedure, administering the medicine to a wrong patient, or the like. In response to a violation of the safety rule, Wearable Device 412 may be configured to issue a safety alert to Nurse 410, or a supervisor thereof. Additionally or alternatively, information determined based on the input provided by the sensors of Wearable Device 412, may be utilized to automatically update a treatment report of Patient 415, such as updating the time of providing the medication and associated data such as the dose, and side effects, activating a timer to alert when flushing of the medication using the intravenous is finished and should be replaced, or the like.

Figure 4B:
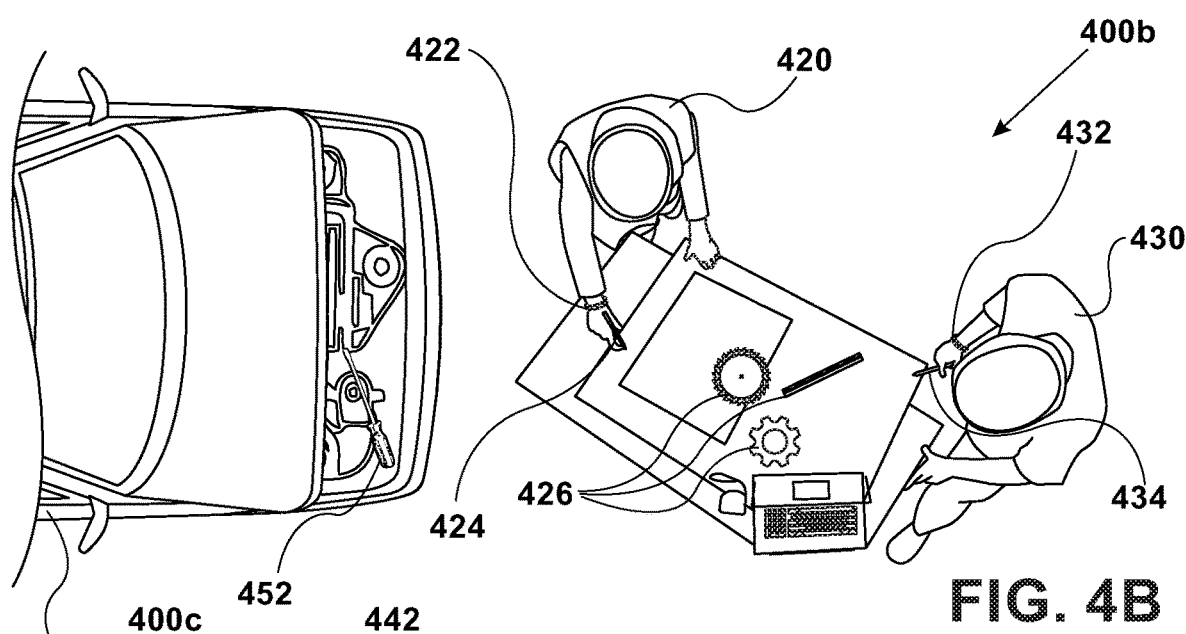

Referring now to FIG. 4B showing schematic illustrations of exemplary environments in which the disclosed subject matter may be utilized, in accordance with some exemplary embodiments of the disclosed subject matter.

In some exemplary embodiments, the disclosed subject matter may be utilized for monitoring other types of work spaces, such as in a Facility 400b. A Wearable Device 422, and a Wearable Device 432, such as 110, 120, or 140 depicted in FIGS. 1A-1C may be configured to be worn by a Worker 420 and a Worker 430 respectively. Wearable Device 422 may be configured to continuously monitor actions of Worker 420 during performing a task, while Wearable Device 432 may be configured to continuously monitor actions of Worker 430. Wearable Device 422 may be configured to identify objects being held by the hand of Worker 420, and the action that the hand performs thereon. Additional parameters of the action and the object may be determined, such as the type of object, the location the object being placed in, a secondary object associated with the action and the object, or the like. Similarly, Wearable Device 432 may be configured to identify objects being held by the hand of Worker 430, and the action that the hand performs thereon.

In some exemplary embodiments, the action identified to be performed by Worker 420 or Worker 430, may be compared with a safety rule relating to the task or work space, such as locating an object in a wrong location, activating a wrong instrument, pushing a wrong button, or the like. In response to a violation of the safety rule, the associated wearable device (422 or 423) may be configured to issue a safety alert to Worker 420 or Worker 430, or a supervisor thereof. As an example, based on the input provided by the sensors of Wearable Device 422, Object 452 may be determined to mistakenly be left in Car 450 after Worker 420 finished working thereon.

Additionally or alternatively, information determined based on the input provided by the sensors of Wearable Device 422 and 432, may be utilized to automatically update a mapping of items in Facility 400b to indicate the geospatial location of objects, such as by updating the geospatial location of Objects 426 based on the location being placed in by the hands of Worker 420 or Worker 430.

Figure 4C:

Referring now to FIG. 4C showing schematic illustrations of exemplary environments in which the disclosed subject matter may be utilized, in accordance with some exemplary embodiments of the disclosed subject matter.

In some exemplary embodiments, the disclosed subject matter may be utilized for monitoring other types of work spaces, such as in a Lab 400c. A Wearable Device 442, such as 110, 120, or 140 depicted in FIGS. 1A-1C, may be configured to be worn by a lab Technician 440. Wearable Device 442 may be configured to continuously monitor actions of Technician 440 during performing her job, during performing an experiment, or the like. Wearable Device 442 may be configured to identify objects being held by the hand of Technician 440, such as Object 444, and the action that the hand performs thereon. Additional parameters of the action and the object may be determined, such as the type of object, the material in the object, the location or instrument that the object or the material being placed in, the equipment utilized to perform the action, a secondary object associated with the action and the object, or the like.

In some exemplary embodiments, the action identified to be performed by Technician 440, may be compared with a safety rule relating to the task or the associated materials, such as locating an object in a wrong location, using a wrong equipment, mixing wrong materials, using dangerous materials, or the like. In response to a violation of the safety rule, Wearable Device 442 may be configured to issue a safety alert to Technician 440, or a supervisor thereof, automatically activate a rescuing action, or the like. Additionally or alternatively, information determined based on the input provided by the sensors of Wearable Device 442, may be utilized to automatically updating a mapping of items in Lab 400c to indicate the geospatial location of objects, such as by updating the geospatial location of each object identified by Wearable Device 442 after being placed by the hands of Technician 440, to automatically update a report of the performed task or experiment, to monitor side effects, or the like.

Figure 5A:
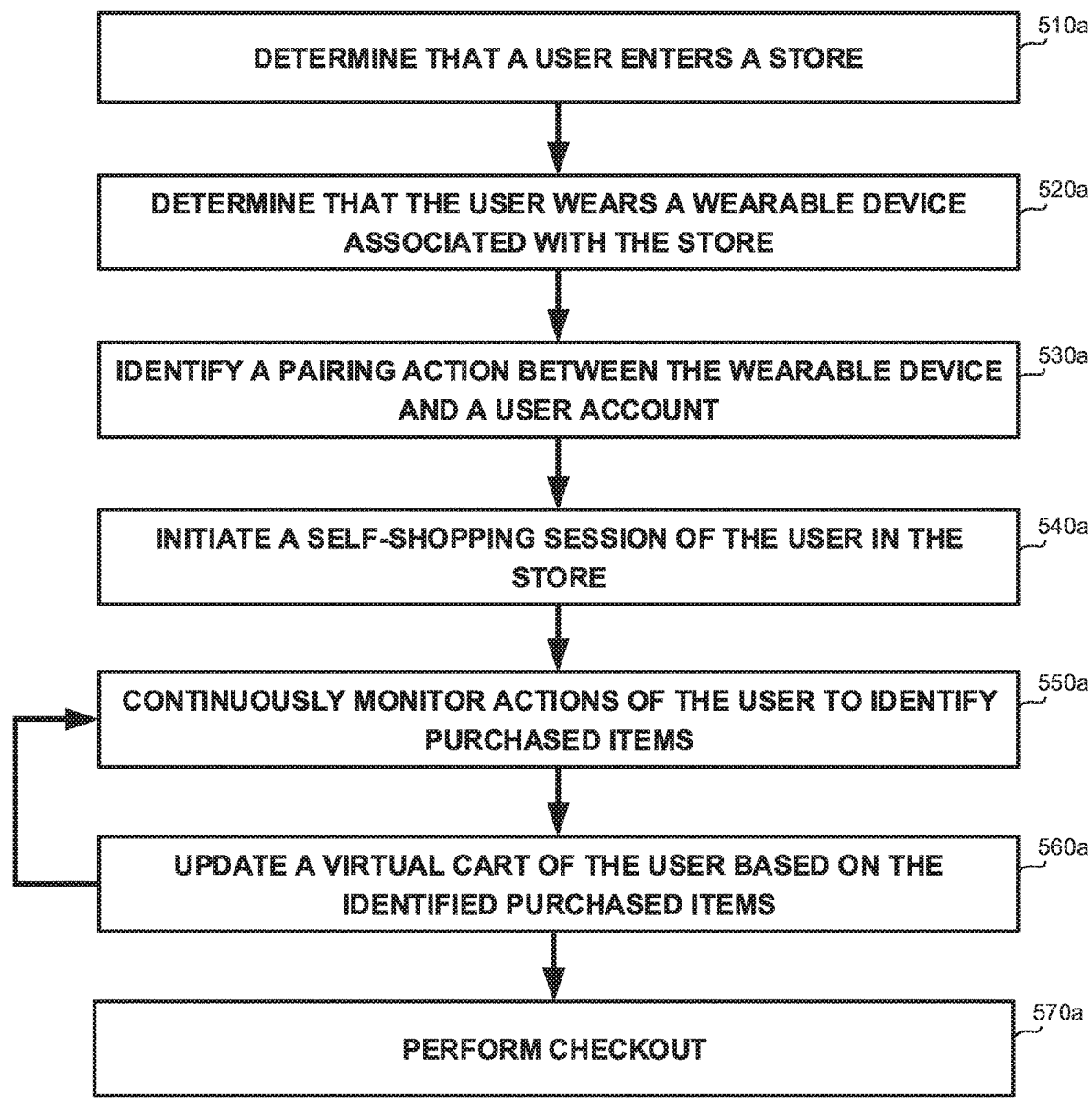
FIGS. 5A-5C show flowchart diagrams of methods, in accordance with some exemplary embodiments of the disclosed subject matter.

Referring now to FIG. 5A showing a flowchart diagram of a method, in accordance with some exemplary embodiments of the disclosed subject matter.

On Step 510a, a determination that a user enters a store may be performed. In some exemplary embodiments, the user may enter the store to perform self-service shopping in the store. The determination may be performed based on an input from the store, such as manual input from a worker in the store, visual input from cameras in the store, geolocation input of the user, or the like.

On Step 520a, the user may be determined to wear a wearable device associated with the store. In some exemplary embodiments, the wearable device may be provided to the user from the store, such as by the retailer, the worker, or the like. Additionally or alternatively, the user may autonomously collect the wearable device upon entering the store.

On Step 530a, a paring action between the wearable device and the user may be identified. In some exemplary embodiments, the pairing may be performed between the wearable device and a computing device of the user, such as via a mobile application. Additionally or alternatively, the pairing may be performed by connecting the wearable device to an account of the user associated with the store, to a temporary account based on entering debit card details, or the like.

On Step 540a, a self-service shopping session of the user may be initiated. In some exemplary embodiments, in response to the pairing action, self-service shopping session of the user may be enabled or initiated, such as by opening a gate to the shopping area, enabling the user to enter the shopping area, or the like.

On Step 550a, actions performed by a hand of the user may be continuously monitored by the wearable device. In some exemplary embodiments, the wearable device may comprise sensors that are configured to capture the hand of the user. The input provided by the sensors may be analyzed to determine an action performed by the user and an object the action is performed thereon. Additionally or alternatively, The input provided by the sensors may be analyzed to determine a physical shopping cart of the user during the self-service shopping. It may be noted that the physical shopping cart may change during the shopping session, and the visual input may be continuously analyzed to validate the physical shopping cart.

On Step 560a, a virtual cart of the user may be updated based on the identified actions and objects. In some exemplary embodiments, the virtual cart may be updated to include objects identified by the wearable device to be picked by the user and placed in a physical shopping cart, and to exclude objects removed therefrom.

On Step 660, a check-out may be performed. In some exemplary embodiments, the check-out may comprise performing a transaction from the user to the store based on the content of the virtual cart.

Figure 5B:
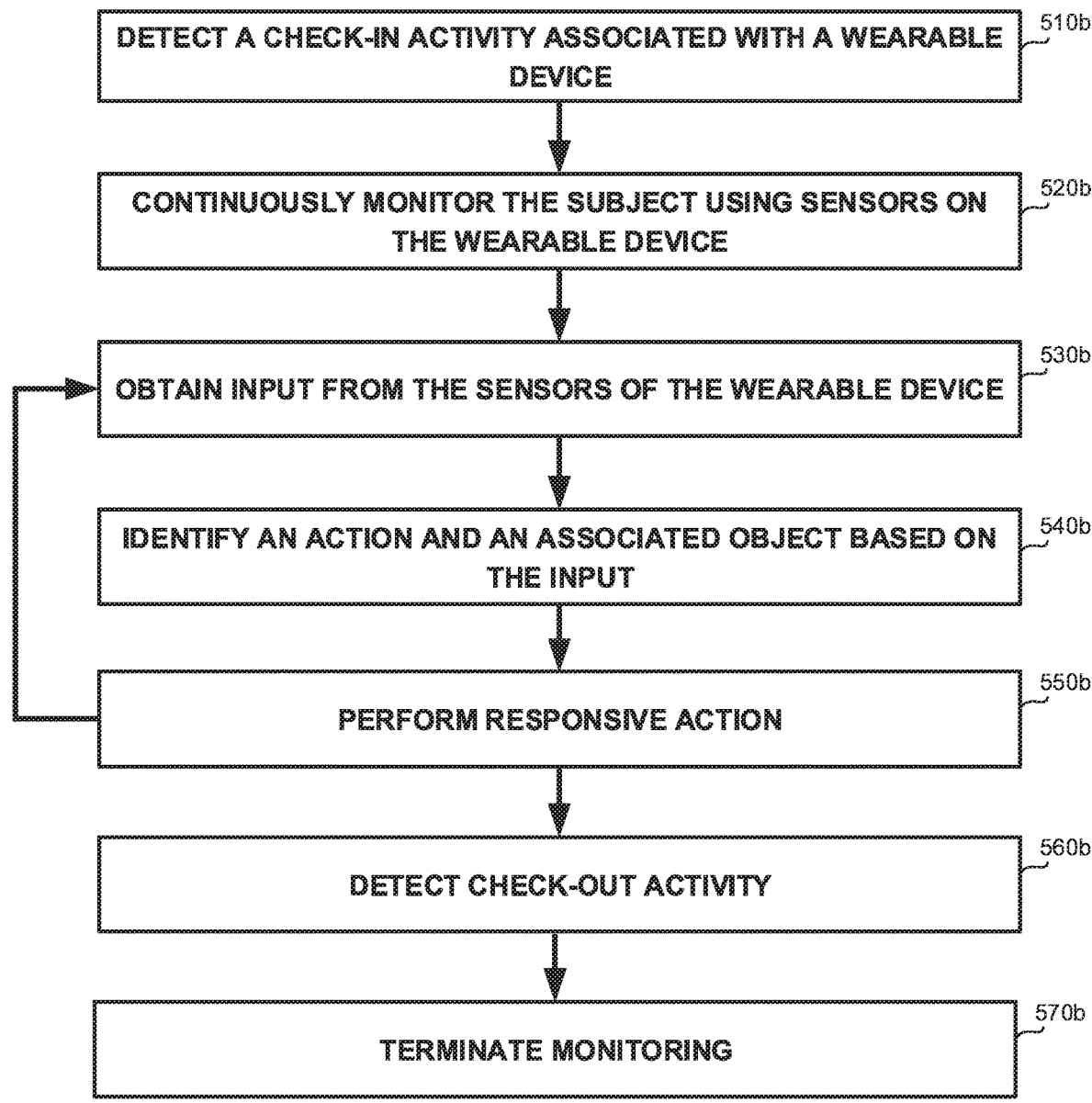

Referring now to FIG. 5B showing a flowchart diagram of a method, in accordance with some exemplary embodiments of the disclosed subject matter.

On Step 510b, a check-in activity being performed in association with a wearable device, may be detected. In some exemplary embodiments, the wearable device may be designed to be worn by a subject. The wearable device may be utilized to monitor the subject, and particularly, hand actions of the subject.

In some exemplary embodiments, the check-in activity may be performed manually by the subject, a supervisor thereof, an administrator, or the like. Additionally or alternatively, the check-in may be performed automatically when the subject wears the wearable device, when the subject enters a monitoring area, when a computing device of the subject connects to a monitoring device, or the like. Additionally or alternatively, the check-in activity may be associated with a predetermined schedule of the subject, such as shift plans, expected arrival time to monitored locations, or the like.

On Step 520b, the subject may be continuously monitored using the wearable device. In some exemplary embodiments, the wearable device may be configured to monitor hand actions of the subject. The wearable device may comprise one or more sensors that are configured to capture at least an interior portion of a hand of the subject, such as the distal portion of the palm of the hand, the fingers, the area between the fingers and the palm, or the like. The one or more sensors may be configured to provide a visual input capturing at least a portion of an object when being held by the hand. Additionally or alternatively, the one or more sensors may be configured to capture an object grasped by fingers of the subject during grasping thereof.

On Step 530b, a visual input may be obtained from the sensor located on the wearable device. In some exemplary embodiments, the visual input may comprise pictures, videos, or any other visual signals recorded by the one or more sensors, such as ultrasound images, holographic images, laser images, heat maps, or the like. The visual input may comprise two-dimensional (2D), three-dimensional (3D) digital images, heat maps panoramic images, spherical images, or the like. In some exemplary embodiments, the visual input may be provided after a processing of the signals captured by the sensor, such as in an imaging process.

In some exemplary embodiments, the wearable device may be configured to be worn on a wrist of the subject, such as at least one of the one or more sensors are positioned to face a palm of the hand. The visual input provided by the one or more sensors may be configured to comprise at least a portion of the interior part of the hand, such as the portion between the palm and the fingers, a portion of the palm between the thumb and the little finger when being folded, or the like. Additionally or alternatively, the wearable device may be configured to be worn on the fingers of the subject, such as the one or more sensors are located on interior portions of the fingers. It may be noted that the one or more sensors may not be configured to capture a full view of the environment surrounding the subject, as a view of the one or more sensor may be blocked, at least in part, by the hand of the subject. Such may enable preserving privacy of the subject and other subjects in the surrounding area, may reduce the amount of irrelevant data, or the like. It may however, be required that the view captures at least the interior part of the hand, such that at least a portion of an object grasped by the hand is captured by the one or more sensors. Accordingly, at least 5%, 10%, 20%, or the like, of the visual input may comprise a view of the at least interior portion of the hand, such as the palm, fingers, or the like.

On Step 540b, an action performed by the subject and an object the action is performed thereon, may be identified based on the visual input. In some exemplary embodiments, the action may be performed by one or both hands of the subject, or by portions thereof, such as the palms, two or more fingers, or the like. In some exemplary embodiments, the action may comprise touching the object using one or both hands of the subject, picking up the object using one or both hands of the subject, releasing the object after being held by one or both hands of the subject, pressing on the object using one or both hands of the subject, moving the object from a first location to a second location one or both hands of the subject, unwrapping the object using one or both hands of the subject, or the like.

In some exemplary embodiments, the identification of the action and the object may be performed by analyzing and processing the visual input, using Artificial Intelligence (AI), machine learning techniques, computer vision techniques, image analysis techniques, such as pattern recognition, digital geometry, or the like. Such techniques may utilize 2D and 3D object recognition, image segmentation, motion detection, 3D pose estimation, automatic numbers recognition, barcode scanning, or the like.

Additionally or alternatively, tracking disposition of the object may be supported by motion sensors or detectors in the wearable device, which may be configured to recognize any movement of the wearable device. Additionally or alternatively, an identification of the object may be performed or supported by barcode scanner.

In some exemplary embodiments, the visual input, comprising pictures, videos or signals recorded by the wearable device, may be sent to and processed by a supporting software configured to match these pictures, videos or signals for the purpose of identifying the object and the action performed thereon. In some cases, the sensor may have a limited visibility of the object and will provide partial pictures, videos or signals thereof. The supporting software may be configured to analyze and match partial pictures, videos or signals of the item and provide the required output from these partial pictures, videos or signals. The supporting software may utilize AI and machine learning to recognize as many as possible actions made by the subject with each object and to identify as many as possible items.

Additionally or alternatively, additional input may be utilized to identify the action and the object, in addition to the visual input, such as input from an accelerator located on the wearable device, or the like.

On Step 550b, a responsive action may be performed based on at least one of the action and the object. It may be noted that determining and performing the responsive action, may be based on on-device computations or on off-device computations, such as performed by an edge device, a cloud-based server, or the like.

In some exemplary embodiments, the responsive action may comprise determining a geospatial location of the object that was identified to be moved by the subject. A mapping of items in a facility may be updated to indicate the object is located at the geospatial location. As an example, mapping of tools in a work location may be continuously updated based on determining actions related to moving tools. As another example, stock of merchandise in a store may be continuously monitored and updated.

Additionally or alternatively, the responsive action may be related to safety inspection. The identified action may be compared with a safety rule, such as avoiding mixing materials in a lab, locating an item in a dangerous place, or the like. In response to a violation of the safety rule, the responsive action may comprise issuing a safety alert to the subject, to a supervisor thereof, or the like. As an example, the safety rule may be a rule relating to an administration of medicine to a patient, such as the dosage, means of administration, sensitivity to drugs, or the like. The subject may be monitored during treatment of patients, and particularly during administration of the medicine. The violation of the safety rule may be administering a wrong dosage of the medicine, administering a wrong medicine, performing a wrong procedure, administering the medicine to a wrong patient, or the like.

On Step 560b, a check-out activity being performed in association with the wearable device, may be detected.

In some exemplary embodiments, the check-out activity may be performed manually by a supervisor or an administrator related to the monitoring task. It may be noted, that the subject may be devoid from manually performing a check-out activity without permission, deactivating the wearable device, or the like. Additionally or alternatively, the check-out activity may be performed automatically when the subject returns the wearable device to a docketing station, when the subject exists the monitoring area, when a computing device of the subject dis-connects from an associated monitoring device, or the like. Additionally or alternatively, the check-out activity may be associated with a predetermined schedule of the subject, such as shift plans, expected arrival time to monitored locations or expected departure times therefrom, or the like. As an example, the check-in and check-out activities may be automatically performed based on workday schedule of an employee, based on a smart calendar of the user, or the like.

On Step 570b, the continuous monitoring may be terminated, in response to the check-out activity. In some exemplary embodiments, termination of the continuous monitoring may be associated with a conclusion response or action, such as issuing a report, performing automatic check-out and payment, or the like.

Figure 5C:
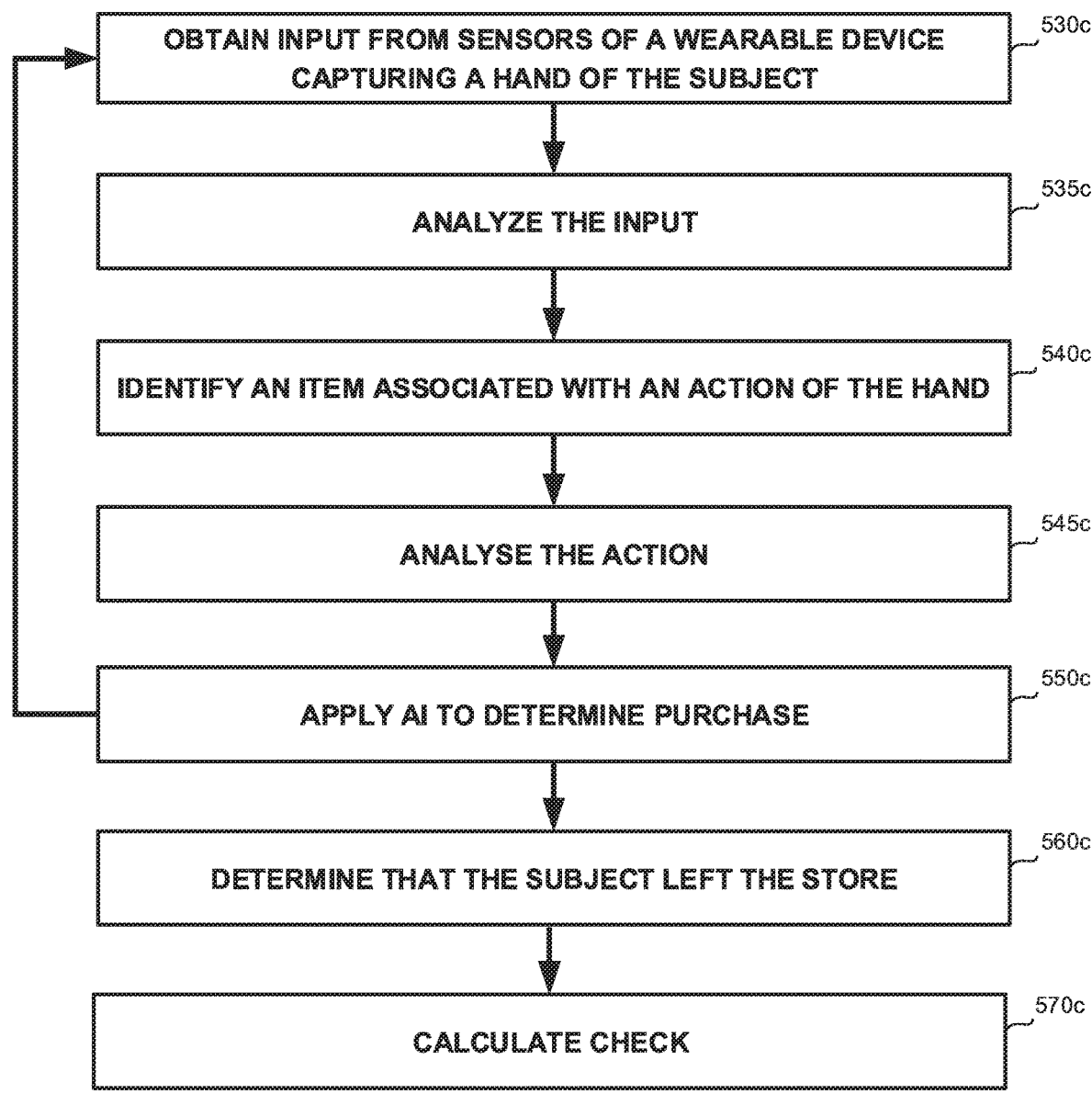

Referring now to FIG. 5C showing a flowchart diagram of a method, in accordance with some exemplary embodiments of the disclosed subject matter.

On Step 530c, an input from sensors of a wearable device may be obtained. In some exemplary embodiments, the wearable device may be worn by a subject. The input may be obtained from a plurality of sensors located on the wearable device, such as cameras, scanners, pressure sensors, or the like. The input may comprise pictures, videos, signals, or the like.

On Step 535c, the input may be analyzed for the purpose of monitoring or tracking the actions of the hand of the subject.

On Step 540c, an item with which the hand of the subject made any action (or refrained from doing an action) may be identified. In some exemplary embodiments, the identification may be performed by analyzing the input data, and comparing with objects of items located in the monitored data, with a registry of items, with a list of rules, or the like.

On Step 545c, the action made by the hand of the subject may be analyzed. In some exemplary embodiments, identification of the action may be performed based on analysis of the input, such as determining features in the pictures indicative of a certain action, determining a movement pattern of the hand associated with an action, or the like. Such actions may be: getting close to the item, touching the item, picking the item, moving the item, releasing the item, or the like.

On Step 550c, AI techniques may be applied to determine the purchase. The AI techniques may be configured to learn the system usage and user's behavior in order to determine the action performed by the shopper and whether the shopper purchased the item. The AI system may further collect and store new and existing items and objects pictures, videos or signals for further learning and training. The AI techniques may be configured to improve the system's recognition and identification of items and objects, and actions made by the user of the wearable smart retail device.

On Step 560c, a determination whether the shopper left the monitored area may be performed. In some exemplary embodiments, the determination may be performed based on location system of a device of the subject, such as a Global Positioning System (GPS) of a device of the user. Additionally or alternatively, the determination may be performed based on a disconnection between the wearable device and a device associated with the monitored area, based on a disconnection between the wearable device and a device associated with the user, or the like.

On Step 570c, the check may be calculated based on the purchased items without the shopper being required to stop at checkout.

Figure 6A:
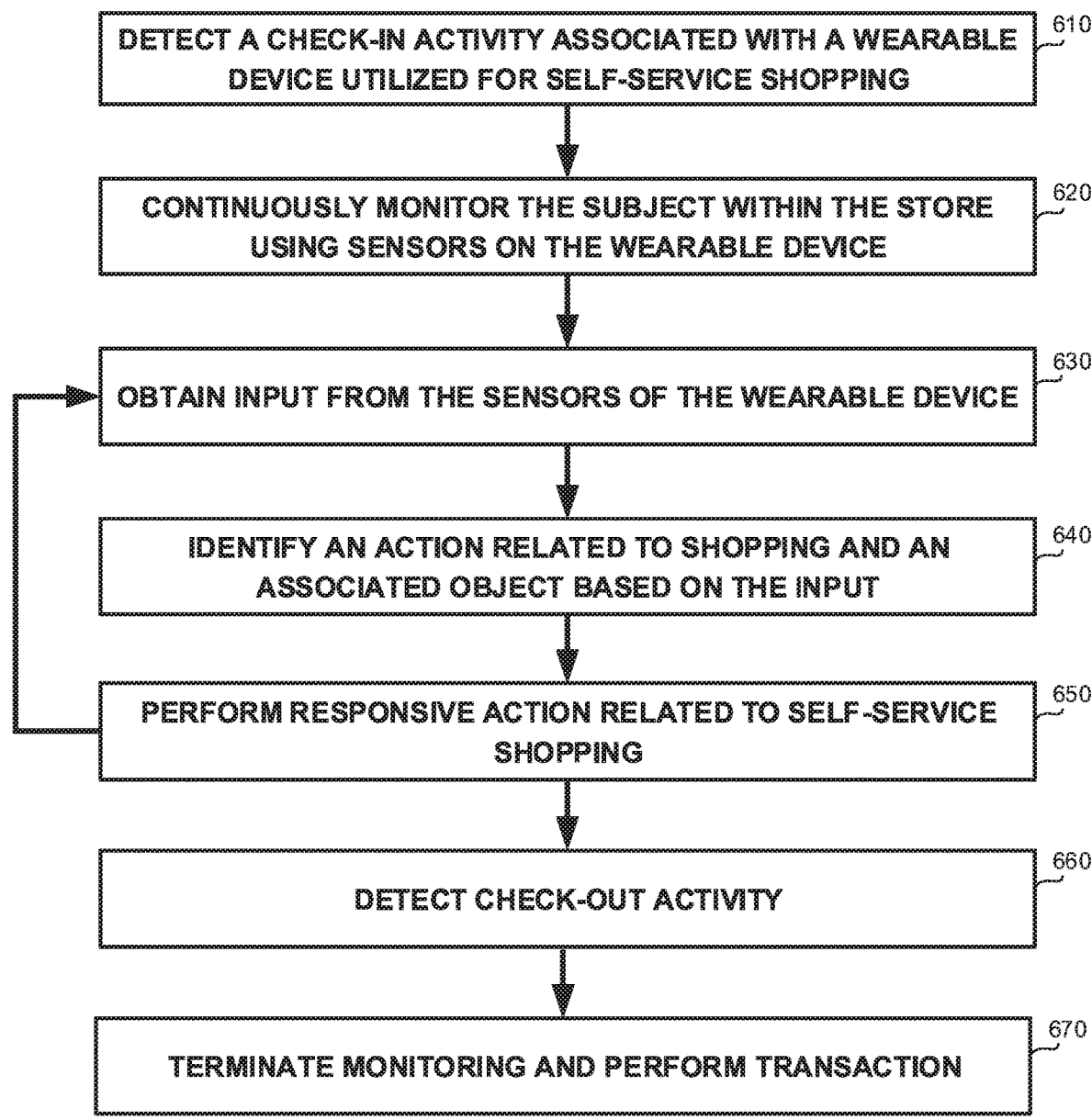
FIGS. 6A-6B show flowchart diagrams of methods, in accordance with some exemplary embodiments of the disclosed subject matter.

Referring now to FIG. 6A showing a flowchart diagram of a method, in accordance with some exemplary embodiments of the disclosed subject matter.

On Step 610, a check-in activity being performed in association with a wearable device for self-service shopping, may be detected. In some exemplary embodiments, the wearable device may be designed to be worn by a subject. The wearable device may be utilized to monitor the subject, and particularly, hand actions of the subject, during self-service shopping of the subject in a store, such as depicted in FIG. 2. The check-in activity may be associated with the subject commencing a self-service shopping session at the store.

In some exemplary embodiments, the wearable device may be provided to the subject by the store. The check-in activity may be performed manually by a retailer or a manger of the store, upon providing the wearable device to the subject, in response to the subject removing the wearable device from a docketing station thereof, upon an activity of the subject related to providing a means of payment, or the like. Additionally or alternatively, the wearable device may be a personal device of the subject, that may be configured to connect to a system of the store. The check-in may be performed automatically when the subject enters the store, when the wearable device of the subject connects to a monitoring device of the store, or the like. It may be noted that in some cases a preliminary registration prior to a first check-in activity may be required, such as to update a shopping profile of the subject, creating an account, providing payment method, providing a shopping list, or the like.

On Step 620, the subject may be continuously monitored in the store using the wearable device (Similar to Step 520 of FIG. 5A). In some exemplary embodiments, the wearable device may be configured to monitor hand actions of the subject. In some exemplary embodiments, the wearable device may be synchronized with other monitoring device of the store, such as security cameras, scales, or the like.

On Step 630, a visual input may be obtained from the sensor located on the wearable device (Similar to Step 530 of FIG. 5A). In some exemplary embodiments, the visual input provided by the wearable device may be enriched using input from sensors of the stores, such as by providing temperature information, weights of objects, or the like. Additionally or alternatively, the visual input may be provided with additional input from other sensors located on the wearable device such as positioning reading of the wearable device, accelerometer readings of the wearable device, or the like.

In some exemplary embodiments, the visual input may be analyzed to automatically determine a real-time shopping cart utilized by the subject during the shopping in the store. The real-time shopping cart may be a physical cart, a shopping bag, a personal bag, a tote, one of the hands of the subject, or any other container. The real-time shopping cart may change during the shopping session. As an example, the subject may utilize different shopping bags for different types of objects, the subject may keep one or more objects in her hands before moving to the shopping cart, the subject may put one or more objects in a plastic bag before being places in the shopping cart, or the like.

On Step 640, an action related to shopping performed by the subject, and an object from the store that the action is performed thereon, may be identified based on the visual input (Similar to Step 540 of FIG. 5A). In some exemplary embodiments, the action may be picking up an item for sale, holding an item, returning an item to its initial location, putting the item in the real-time shopping cart, removing the item form the real-time shopping cart, changing the real-time shopping cart, or the like.

Additionally or alternatively, a returning action may be identified based on the visual input, based on an input flowing the visual input, such as later in time, proceeding the visual input, or the like. The returning action may comprise removing the object from the shopping cart, returning the object to a location within the store, or the like. The returning action may be indicative of the subject decision not to purchase the object after being determined as item for sale.

Additionally or alternatively, the identification of the action and the object may be performed using additional input from other sensors on the wearable device, such as a positioning reading of the wearable device during performing the action, accelerometer readings, or the like. In some exemplary embodiments, a subset of a catalog of items may be determined based on the positioning reading of the wearable device, such as a catalog comprising items located in a respective location within the store. A product recognition with respect to the subset of the catalog of items, may be performed to identify the object.

In some exemplary embodiments, the action may be determined to be associated with a tampering event during the self-service shopping session. The tampering event may be an event aimed at interfering with monitoring of the hand of the subject using the wearable device. The action may comprise removal of the wearable device, blocking view of the sensor, or the like. In some exemplary embodiments, detection of such actions may be performed based on a behavioral pattern of the subject that is indicative of an attempt to prevent monitoring of the hand of the subject, such as a behavioral pattern indicating one hand removing the wearable device from the other hand, moving the hand in certain direction, or the like. The behavioral pattern may be determined based on accelerometer readings of the wearable device to determine.

On Step 650, a responsive action related to the shopping process may be performed based on at least one of the action and the object. In some exemplary embodiments, the responsive action may comprise updating a virtual cart of the subject to include the object picked up by the subject as a purchased item. In some exemplary embodiments, a content of the virtual cart may be displayed to the subject, such as on a mobile device of the subject, on a screen on the shopping cart, or the like. The responsive action may further comprise highlighting the object as the recent item added to the cart, suggesting approval of the item by the subject, displaying the price of the object, alerting the subject of sales associated with the object, or the like. The responsive action may further comprise emitting an auditory cue indicating the addition of the object to the virtual cart, or the like. In some exemplary embodiments, the responsive action may further comprise automatically calculating an updated check to include the price of the object.

In some exemplary embodiments, the wearable device may be configured to provide a real-time signal and feedback for the subject, a retailer, or the like. The real-time signal may comprise identification of the object and actions made with it. Such real-time signal may be a positive/negative signal, such as green light displayed by wearable device to make a positive identification of an item, and a red light which will be displayed when the retail smart wristband identifies that an item was picked but was unsuccessful with identifying the parameters of the item (unique name or identifier) or the action made with the item, or the like. Additionally or alternatively, the positive or negative identification may be displayed using the shopping cart of the subject, such as via the screen, using LED lights, or the like. The signal may be sent in real-time or later to the retailer as well, and may be used by the retailer, for example, in real time to determine if a shopping cart or a shopping bag should be "qualified" or "disqualified" for continuing the shopping under self-service. Additionally or alternatively, the objects which the system recognized as released in the shopping cart or bag, may be listed in a designated mobile app. The subject may be able to check in real-time if the system's list is accurate, and to avoid the inconvenience caused by leaving the store with unlisted items.

Additionally or alternatively, in response to determining a returning action, the responsive action may comprise updating the virtual cart of the subject to exclude the object. The responsive action may further comprise emitting an auditory cue indicating the removal of the object to the virtual cart, updating the check to exclude the price of the object, suggesting alternative items to the subject, or the like.

Additionally or alternatively, in response to detecting a tampering event, the responsive action may comprise performing an anti-tampering action, such as issuing an alert, ending the shopping session, indicating the associated object as a purchased item, or the like. It may be noted that the wearable device is configured to perform detection of such tampering events, only during the self-service shopping session. The subject may be able to perform the tampering event after the self-service shopping session ends without resulting in the anti-tampering action.

Additionally or alternatively, the wearable device may be utilized to remove a theft detection tag coupled with the object. The responsive action may comprise indicating the object as purchased, ensuring payment for the object, or the like.

On Step 660, a check-out activity being performed in association with the wearable device, may be detected. (Similar to Step 560b of FIG. 5B). In some exemplary embodiments, the check-out activity may be indicative of finishing the self-service shopping, such as by exiting the store, returning the wearable device, or the like. In some exemplary embodiments, the continuous monitoring may be terminated, in response to the check-out activity. Additionally or alternatively, the check-out activity may be associated with an inspection activity before allowing the subject to leave the store, such as a manual inspection performed by the retailer, an automatic inspection performed by a scanning machine of the store, an indication from the wearable device (such as via an output component thereof) that the virtual cart is validated, or the like.

On Step 670, a transaction may be performed based on content of the virtual cart of the subject. In some exemplary embodiments, a check may be calculated based on the items that were identified to be picked, put in the shopping cart and updated in the virtual cart. A transaction matching the check may be performed. In some exemplary embodiments, the transaction may be required to be approved the subject prior to being executed. In some exemplary embodiments, the continuous monitoring may be terminated, in response to the check-out activity. In some exemplary embodiments, the continuous monitoring may be terminated.

Figure 6B:
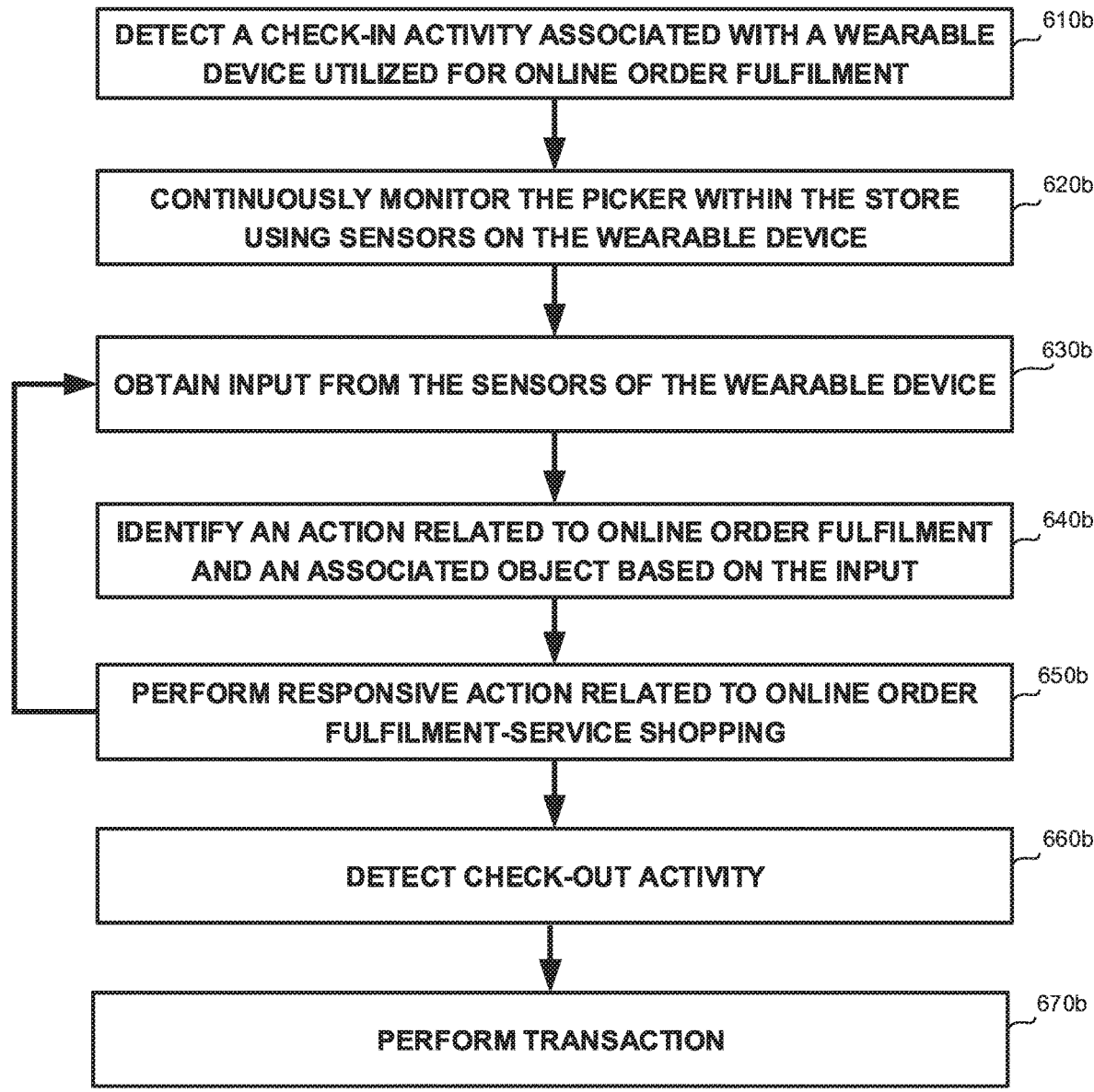

Referring now to FIG. 6B showing a flowchart diagram of a method, in accordance with some exemplary embodiments of the disclosed subject matter.

On Step 610b, a check-in activity being performed in association with a wearable device for on-line shopping service, may be detected. In some exemplary embodiments, the wearable device may be designed to be worn by a picker responsible of manual fulfilment of shopping orders of one or more customers. The wearable device may be utilized to monitor the picker during the fulfilment of the shopping order in a store, such as depicted in FIG. 2.

In some exemplary embodiments, the wearable device may be utilized by the picker for multiple orders simultaneously. Each check-in activity may be associated with a different customer. The check-in activity may comprise connecting to a list of items selected by the customer, connecting to an online chat with the customer, or the like. The check-in activity may be performed manually by the picker. The picker may be enabled to switch between accounts of different customers during the shopping session.

On Step 620b, the picker may be continuously monitored in the store using the wearable device (Similar to Step 620 of FIG. 6A).

On Step 630b, a visual input may be obtained from the sensor located on the wearable device (Similar to Step 630 of FIG. 6A).

On Step 640b, an action related to the fulfilment of the shopping order performed by the picker, and an object from the store that the action is performed thereon, may be identified based on the visual input (Similar to Step 640 of FIG. 6A). In some exemplary embodiments, the action may be picking up an object, holding an object, returning an object to its initial location, placing the object in a shopping cart or a tote associated with the shopping order of the customer, removing the object form the shopping cart, or the like.

On Step 650b, a responsive action related to the picking process (e.g. the fulfillment of the shopping order of the customer) may be performed based on at least one of the action and the object. In some exemplary embodiments, the responsive action may comprise identifying a corresponding item to the object in the list of items, and marking the corresponding item as fulfilled. Additionally or alternatively, the responsive action may comprise identifying a mismatch between the object and the list of items, and accordingly alerting the picker of the mismatch.

On Step 660b, a check-out activity being performed in association with the wearable device, may be detected. (Similar to Step 660 of FIG. 6A). In some exemplary embodiments, the check-out activity may be indicative of finishing the order of the associated customer. In some exemplary embodiments, the continuous monitoring may be terminated, in response to the check-out activity. Additionally or alternatively, the continuous monitoring may be continued with respect to other orders fulfilment of other customers.

On Step 670b, a transaction may be performed based on content of the virtual cart of the customer. In some exemplary embodiments, a check may be calculated based on the items that were identified to be picked, put in the shopping cart and updated in the virtual cart.

Figure 7:
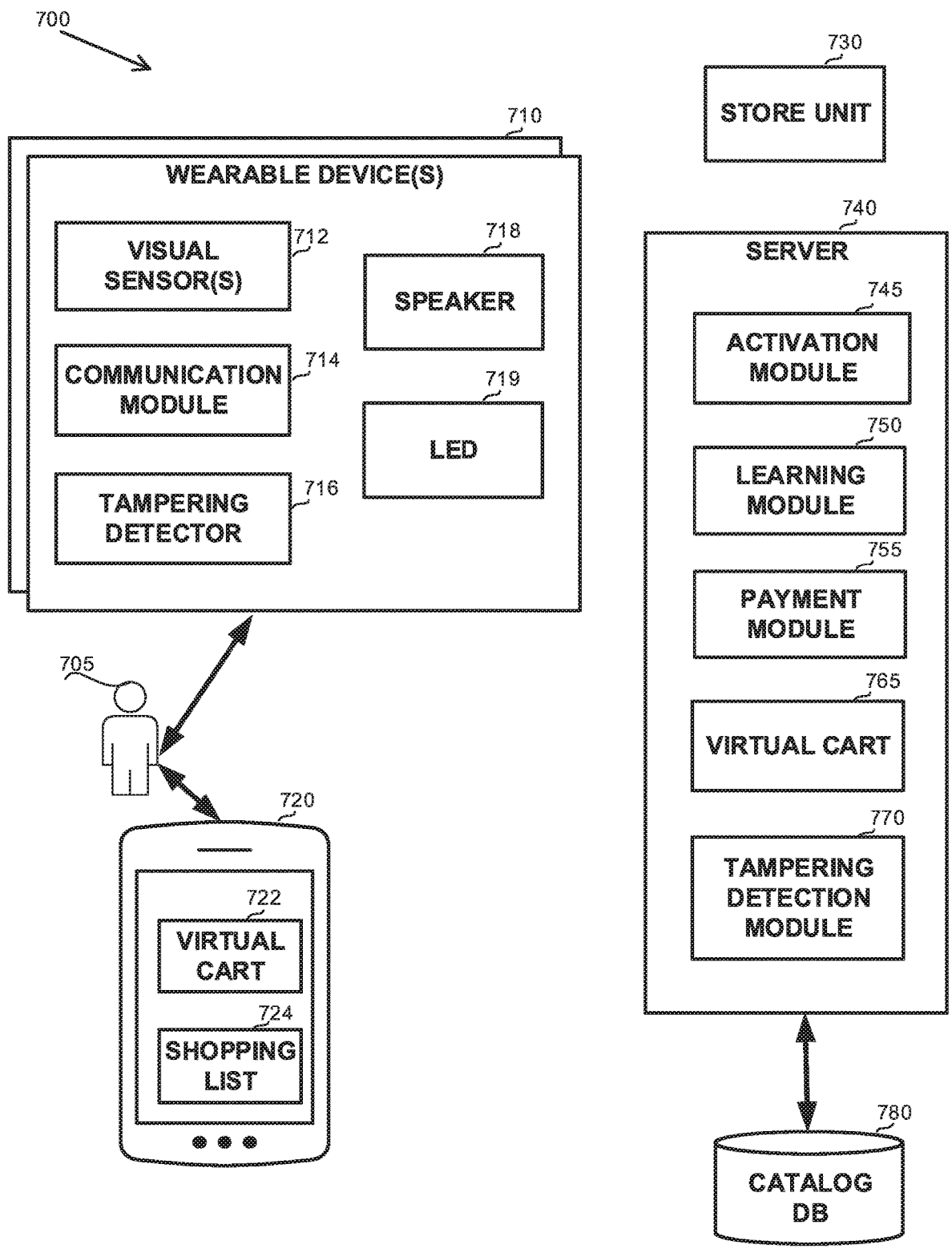
FIG. 7 shows a block diagram of a system, in accordance with some exemplary embodiments of the disclosed subject matter.

Referring now to FIG. 7 showing a block diagram of a system, in accordance with some exemplary embodiments of the disclosed subject matter.

In some exemplary embodiments, a System 700 may be utilized to manage a self-service shopping of a User 705 in a store, or online-shopping fulfillment for customers by User 705, or the like. Additionally or alternatively, similar applications of System 700 may be utilized for other facilities to perform monitoring of hand actions of users, such as in health-care systems to monitor action of health-care staff members, in airplanes to monitor actions of pilots, in augmented reality video games to monitor actions of players, or the like.

In some exemplary embodiments, System 700 may comprise a plurality of Wearable Devices 710 each of which is being worn on a hand of user such as User 705. Each Wearable Device 710 may be configured to be worn on the hand of User 705, in a manner enabling capturing interior portion thereof, such as on a wrist of User 705, on fingers of User 705, on a hand palm of User 705, or the like. Wearable Device 710 may be configured to be utilized to identify items grabbed by the hand of User 705 and moved to or from a physical shopping tote of User 705.

In some exemplary embodiments, Wearable Device 710 may comprise a Visual Sensor 712. Visual Sensor 712 may be configured to continuously capture an interior portion of the hand of User 705. Wearable Device 710 may be configured to provide visual input captured by Visual Sensor 712 to be utilized to identify activity performed by the hand of User 705, such as an action performed by the hand, an object upon which the action is performed, or the like. Visual Sensor 712 may comprise a single lens, one or more lenses, or the like. Visual Sensor 712 may be configured to capture pictures, videos, signals, a combination thereof, or the like. In some exemplary embodiments, In some exemplary embodiments, Wearable Device 710 may comprise a Communication Unit 714. Communication Unit 714 may be configured to connect Wearable Device 710 to a controller external thereto, such as to a mobile Device 720 of User 705, Store Unit 730, to Server 740, or the like. Wearable Device 710 may be automatically activated when connected to Store Unit 730, such as based on connecting to a Wi-Fi network in the store associated with Store Unit 730, using an activation interface associated with Store Unit 730, based on the location readings of Wearable Device 710 being conformed with location of Store Unit 730, or the like. Similarly, Wearable Device 710 may be de-activated when leaving the store, such as based on dis-connecting from Store Unit 730, based on store Unit identifying that User 705 left the store, or the like.

In some exemplary embodiments, Wearable Device 710 may be associated with an application of a computing Device 720 of User 705, such as a mobile app, or the like. The mobile app may be a standalone native app, a feature embedded in or hosted by third party app(s), or the like. User 705 may receive data associated with the shopping session to Device 720, provide feedback, or the like. The data may be provided in real time or post actions. In some exemplary embodiments, the data may be displayed on a screen of Device 720, using the designated application or the like. As an example, Device 720 may be utilized to display a Virtual Cart Display 722 for User 705, upon initiating a self-shopping session, indicating the items shopped thereby. Additionally or alternatively, Device 720 may be utilized to display a Shopping List 724 for User 705.

In some exemplary embodiments, System 700 may comprise a Server 740. Server 740 may be configured to support the monitoring and identification of hand actions of users in the store, such as User 705, to perform respective responsive actions, to issue output to User 705 or to Store Unit 730. or the like.

In some exemplary embodiments, activation and de-activation of Wearable Device 710 may be performed automatically by an Activation Module 745 of Server 740. Wearable Device 710 may be devoid of a de-activation interface for User 705. The activation of Wearable Device 710 may be performed in response to identifying a check-in activity associated with User 705, such as a connection from Wearable Device 710 to Store Unit 730, an indication from Activation Module 745 that Wearable Device 710 is collected by User 705, based on a pairing between Wearable Device 720 and Store Unit 730, or the like. Similarly, the deactivation of Wearable Device 710 may be performed in response to determining a check-out activity associated with User 705.

In some exemplary embodiments, Server 740 may comprise a Control Module 750 configured to analyze input obtained from Wearable Device 710 to identify an action performed by the hands of User 705 and an object which upon the action is performed. Control Module 750 may be configured to identify items or objects with which the hand of User 705 made any action, or refrained from doing an action therewith. Additionally or alternatively, the action may be associated with modifying content of a physical shopping tote of User 705. Control Module 750 may be configured to recognize when the hand of User 705 is getting close to an item, picking an item, holding an item (as an example, while the object stays constant at the hand), moving an item (as an example, background picture changed), releasing an item, or the like.

In some exemplary embodiments, Server 740 may comprise a Catalog Database 780 retaining visual representations of items in the store. Control Module 750 may be configured to recognize the object which upon the hand of User 705 performs the action based on Catalog Database 780. Catalog Database 780 may be retained by System 700. Control Module 750 may be configured to compare and match objects identified in the input with objects of items stored in Catalog Database 780. Prior to activating the solution, all items which may be sold in the store may be pictured from different angels, categorized and stored in Catalog Database 780. When Control Module 750 recognizes that the hand(s) of User 705 made an action or got close to an item, the picture, video or signal of the item may be matched with Catalog Database 780, and identified thereof (or not identified, if such item is not listed in the database or matching has not succeeded). Additionally or alternatively, Catalog Database 780 may comprise a plurality of partial databases for each store. The partial database may comprise items that are known to be in the store in a certain location. In order to speed the identification of an item, instead of searching the entire database each time, only the items, which the service is aware of being located in the store at the certain location, or located next to the location of Wearable Device 710, may be searched. In case that Control Module 750 does not find the item in that partial database, Control Module 750 may search the whole Catalog Database 780 for that item. Control Module 750 may be configured to know what items are located in a certain stores based on an inventory list obtained from the User 705, Store Unit 730, or the like. Additionally or alternatively, Control Module 750 may be configured to know what items are located in a certain store based on information obtained from wearable device used by the retailer's worker upon arranging the store. Each item that is located in the store may be identified and listed in the partial database of the store.

Additionally or alternatively, Control Module 750 may be configured to identify parameters of the item, such as type, category, name, shape, size, or the like. Such parameters may be identified based on data retained in Catalog Database 780, or other databases. In some exemplary embodiments, Control Module 750 may be configured to apply machine learning techniques, classification techniques, image processing techniques, AI techniques, or the like, in order to identify the object and the action performed thereon, to learn behavior of User 705, shopping habits thereof, or the like. Control Module 750 may be configured to collect and store information related to new or existing items and objects, such as pictures, videos, signals, classifications, or the like, in Catalog Database 780. Control Module 750 may be configured to improve the recognition and identification of items and objects of System 700, actions made by User 705, or the like.

Additionally or alternatively, Control Module 750 may be configured to obtain visual input of the content of the physical shopping tote, such as from Wearable Device 710, or other visual sensors of the store associated with Store Unit 730, sensors of User Device 720, or the like. Control Module 750 may be configured to determine a discrepancy between content of Virtual Cart 760 and the content of the physical shopping tote, such as based on identifying the items in the physical shopping tote and comparing the identified items to the items listed in in Virtual Cart 760. Control Module 750 may be configured to perform a responsive action in response to the determined discrepancy, such as by marking Virtual Cart 760 as invalidated, updating Virtual Cart 760 based on the visual input of the content of the physical shopping tote, or the like.

Additionally or alternatively, Control Module 750 may be configured to determine a mapping of geo-spatial locations of items in the store. Control Module 750 may be configured to identify a placement location of each object moved by User 705 or any other user, such as a worker in the store, and update the mapping to indicate a location of the object based on the placement location.

In some exemplary embodiments, Control Module 750 may be configured to determine a responsive action based on the action or the object. Control Module 750 may be configured to update a Virtual Cart 760 in response to the identification of the action by the user, such as adding and item, removing an item, or the like. Virtual Cart 760 may indicate a list of items shopped by User 705. Virtual Cart 760 may be automatically updated based on items moved to and from the physical shopping tote of User 705, such as by adding items to Virtual Cart 760 based on items picked up and put into the physical shopping tote of User 705 and removing items from Virtual Cart 760 based on items removed from the physical shopping tote of User 705. Virtual Cart Display 722 on Device 720, may be automatically updated in response to updating Virtual Cart 760.

In some exemplary embodiments, Control Module 750 may be configured to issue an output to User 705. The output may be issued to Device 720 of User 705, such as by displaying the content of Virtual Cart 760 to User 705 using Device 720 (Virtual Cart Display 722), such as issuing an audio alert using a Speaker 718 on Wearable Device 710, using a LED light bulb 719 on Wearable Device 710, or any other visual output, to provide an indication of an addition of an item to or removal of an item from Virtual Cart 760.

In some exemplary embodiments, System 700 may comprise a Payment Module 755 configured to manage payments and transactions associated with the self-service shopping. Control Module 750 may be configured to invoke Payment Module 755 in response to a check-out activity of User 705. Control Module 750 may be configured to perform a transaction based on a list of shopped items of the user as indicated in Virtual Cart 760.

Additionally or alternatively, Server 740 may comprise a Tampering Detection Module 765. Tampering Detection Module 765 may be configured to monitor and detect a tamper event during a shopping session of User 705. Tampering Detection Module 765 may be configured to avoid monitoring user activity outside the shopping session. Tampering Detection Module 765 may be configured to determine an attempt to perform a tampering event by User 705. Tampering Detection Module 765 may be configured to deduce information from gyroscope and accelerometer readings, such as to identify attempts by User 705 to block the view of Wearable Device 710, a behavioral pattern indicative of a tampering event, or the like. As an example, based on the sensor readings, it may be possible to identify that the shopper is putting his hand behind his back in an unnatural manner. As another example, the behavioral pattern of the subject determined based on the accelerometer readings may be indicative of one hand removing Wearable Device 710 from the other hand, moving the hand in certain direction, or the like. Additionally or alternatively, Tampering Detection Module 765 may be associated with a Tampering Detector 716 located on Wearable Device 710. Tampering Detector 716 may be configured to monitor and detect a tampering event during the self-shopping session of user 705. Tampering Detector 716 may be configured to identify an attempt to remove Wearable Device 710, blocking view of Sensor 712 by the hand or other object, an attempt to disconnect Wearable Device 710 from Store Unit while still located in the store such as by covering Wearable Device 710 with an electromagnetic wave insulating material, an attempt to disturb the monitoring such as by entering a Faraday shield used to block electromagnetic fields, or the like. It may be noted that Tampering Detector 716 may operate independently from Tampering Detection Module 765, without Server 740 comprising Tampering Detection Module 765, or the like. Tampering Detection Module 765 may be configured to perform an anti-tampering action in response to detecting the tampering event, such as issuing an alert to Store Unit 730.

It may be noted that System 700 may be configured to operate also in crowded stores, having a ratio between number of people in the store and a floor size of the store in squared meters above 1:10, above 1:20, above 2:10, or the like. As the visual input from each user is obtained independently from other users, while on user is not supposed to block the visual input capturing the hand actions of the other users. The analysis performed on one user may also be independent from the analysis performed for other users. As an example, a cashier free store, utilizing in-store cameras with an area of 400 square meters, may function only with fewer than 20shoppers inside, as one shopper may block the view for the cameras for observing other shoppers. However, System 700 may operate with any number of shoppers the store can regularly handle, such as above 40 shoppers, above 80 shoppers, above 100 shoppers, or the like, as the analysis performed by System 700 is based on visual input from each shopper, without affecting the visual input provided by other shoppers in the store.

Additionally or alternatively, Wearable Device 710 may be configured to be utilized for manual fulfillment of a shopping order of a customer by User 705. User 705 may be a picker tasked with picking items to fulfill the shopping order of the customer. The shopping order may comprise a List 724 of items selected by the customer and transmitted to Device 720 of User 705. Control Module 750 may be configured to identify a picking captured by Wearable Device 710, such as picking up an object and placing the object in a tote associated with the shopping order of the customer. Control Module 750 may be configured to identify a corresponding item to the item in the shopping order (e.g. in List 724) and mark the corresponding item as fulfilled. In response to a determination that the shopping order is fulfilled, Control Module may be configured to invoke Payment Module 755 to enable a transaction from the customer to Store Unit 730, based on the fulfilled shopping order, or a portion thereof determined as fulfilled.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining a visual input from a sensor located on a wearable device, wherein the wearable device is worn by a subject and utilized during a collection session, wherein the collection session is defined as beginning upon an identification of a first activity, wherein the collection session is defined as ending upon an identification of a second activity, wherein the sensor is configured to capture at least an interior portion of a hand of the subject;
    identifying, based on the visual input, a picking-up action performed by the subject using the hand of the subject in which the subject picks up an item, wherein the picking-up action is a non-gesture action, that is not intended to convey an instruction to the wearable device, wherein said identifying comprises identifying the item;
    performing a responsive action based on at least one of the picking-up action and the item; and
    in response to detecting a tampering event potentially interfering with monitoring of the hand of the subject using the wearable device, performing an anti-tampering action, wherein the anti-tampering action comprises issuing an alert, wherein said detecting is performed only during the collection session, whereby the subject is unable to perform the tampering event during the collection session without resulting in the anti-tampering action and the subject is able to perform the tampering event after the collection session ends without resulting in the anti-tampering action.

2. The method of claim 1 further comprises:
    in response to detecting the first activity being performed, continuously monitoring the subject, wherein said continuously monitoring the subject comprises said obtaining the visual input, wherein said continuously monitoring is terminated upon detecting a check out the second activity being performed.

3. The method of claim 1, wherein the interior portion of the hand comprises a distal portion of a palm, whereby the visual input captures at least a portion of the item when the item is being held by the hand.

4. The method of claim 1, wherein the wearable device is configured to be worn on a wrist of the subject, whereby positioning the sensor to face a palm of the hand.

5. The method of claim 1, wherein a view of the sensor is blocked, at least in part, by the hand.

6. The method of claim 1, wherein at least 5% of the visual input comprises a view of the interior portion of the hand.

7. The method of claim 1,
wherein the collection session is a self-service shopping session of the subject in a store, whereby enabling the subject to shop in the store without manually scanning purchased items before leaving the store;
wherein the item is an item for sale in the store;
wherein the responsive action comprises:
updating a virtual cart of the subject to include the item for sale.

8. The method of claim 7 further comprises:
obtaining a second visual input from the sensor;
determining, based on the second visual input, a second non-gesture action relating to the item for sale;
determining based on the second non-gesture action, that the subject has decided not to purchase the item for sale; and
in response to said determining, based on the second visual input and the second non-gesture action, updating the virtual cart of the subject to exclude the item for sale.

9. The method of claim 7, wherein said identifying comprises identifying the item for sale based on the visual input and based on a positioning reading of the wearable device;
wherein the method further comprises:
determining, based on the positioning reading of the wearable device, a subset of a catalog of items; and
performing product recognition to identify the item for sale, wherein the product recognition is performed with respect to the subset of the catalog of items.

10. The method of claim 7 further comprises:
obtaining a second visual input from the sensor, wherein the second visual input captures a content of a physical tote;
determining, based on the virtual cart and on the second visual input, a discrepancy between content of the virtual cart and content of the physical tote; and
in response to said determining, performing a second responsive action, wherein the second responsive action comprises at least one of: marking the virtual cart as invalidated and updating the virtual cart based on the second visual input.

11. The method of claim 1, wherein the tampering event comprises at least one of: removal of the wearable device and blocking view of the sensor.

12. The method of claim 1, wherein said detecting the tampering event comprises obtaining readings from a motion sensor of the wearable device to determine a behavioral pattern of the subject that is indicative of an attempt to prevent monitoring of the hand of the subject.

13. The method of claim 1,
wherein the wearable device is utilized for manual fulfillment of a shopping order of a customer, wherein the shopping order comprises a list of items;
wherein the subject is a picker picking items to fulfill the shopping order of the customer;
wherein the picking-up action comprises picking up the item and placing the item in a tote associated with the shopping order of the customer; and
wherein the responsive action comprises:
identifying a corresponding item to the picked up item in the list of items; and
marking the corresponding item as fulfilled.

14. The method of claim 1,
wherein the picking-up action comprises placing the item;
wherein the responsive action comprises:
determining a geospatial location of the item after being placed, and updating a mapping of items in a facility to indicate the item is located at the geospatial location.

15. The method of claim 1,
wherein the wearable device comprises a first wearable component and a second wearable component, wherein the first wearable component is configured to be worn on the hand of the subject, wherein the second wearable component is configured to be worn on a second hand of the subject,
wherein the sensor comprises a first sensing component located on the first wearable component and a second first sensing component located on the second wearable component,
wherein the visual input comprises input from the first sensing component and from the second sensing component.

16. The method of claim 1, wherein the responsive action comprises: comparing the picking-up action with a rule; and in response to a violation of the rule, issuing a safety alert.

17. A wearable device, wherein the wearable device is configured to be worn on a hand of a user and utilized during a collection session, wherein the collection session is defined as beginning upon an identification of a first activity, wherein the collection session is defined as ending upon an identification of a second activity, wherein the wearable device comprises:
a visual sensor configured to continuously capture an interior portion of the hand, wherein the wearable device is configured to provide images captured by the visual sensor to be utilized to identify a a picking-up action performed by the hand of the user and to identify an object upon which the picking-up action is performed, wherein the picking-up action is a non-gesture action, that is not intended to convey an instruction to the wearable device,
a communication unit configured to connect the wearable device to a controller external to the wearable device; and
a tampering detection module, wherein said tampering detection module is configured to monitor and detect a tampering event during the collection session and cause performance of an anti-tampering action, wherein the anti-tampering action comprises issuance of an alert in response to a detection of the tampering event, wherein the tampering event is an event potentially interfering with monitoring of the hand of the user, wherein said tampering detection module is configured to avoid monitoring user activity outside the collection session, whereby the user is unable to perform the tampering event during the collection session without resulting in the anti-tampering action and the user is able to perform the tampering event after the collection session ends without resulting in the anti-tampering action.

18. The wearable device of claim 17, wherein activation and de-activation of the wearable device is performed automatically by the controller.

19. The wearable device of claim 17, wherein the wearable device is configured to be utilized for self-service shopping, wherein the wearable device is configured to be utilized to identify items grabbed by the hand and moved to or from a physical shopping tote of the user, wherein the items are identifiable based on input of the visual sensor.

20. The wearable device of claim 17, wherein the wearable device is configured to be associated with a virtual cart upon initiating a self-shopping session, wherein the virtual cart indicates a list of items shopped by the user, wherein the virtual cart is automatically updated based on items moved to and from a shopping cart.

21. The wearable device of claim 17, wherein the wearable device is configured to be utilized for manual fulfillment of a shopping order of a customer, wherein the shopping order comprises a list of items; wherein the user is a picker tasked with picking items to fulfill the shopping order of the customer; wherein the picking-up action comprises picking up the object and placing the object in a tote associated with the shopping order of the customer.

* * * * *